United States Patent
Bench et al.

(10) Patent No.: US 10,401,526 B2
(45) Date of Patent: Sep. 3, 2019

(54) BURIED UTILITY MARKER DEVICES, SYSTEMS, AND METHODS

(71) Applicants: Stephanie M. Bench, Carlsbad, CA (US); Mark S. Olsson, La Jolla, CA (US)

(72) Inventors: Stephanie M. Bench, Carlsbad, CA (US); Mark S. Olsson, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 401 days.

(21) Appl. No.: 15/434,056

(22) Filed: Feb. 16, 2017

(65) Prior Publication Data

US 2017/0299757 A1    Oct. 19, 2017

Related U.S. Application Data

(60) Provisional application No. 62/295,502, filed on Feb. 16, 2016.

(51) Int. Cl.
*G01V 3/10* (2006.01)
*G01V 3/165* (2006.01)
(Continued)

(52) U.S. Cl.
CPC ............ *G01V 3/165* (2013.01); *G01V 3/10* (2013.01); *G01V 3/15* (2013.01); *G01V 15/00* (2013.01)

(58) Field of Classification Search
CPC . G01V 3/10; G01V 3/12; G01V 15/00; G01V 3/15; G01V 3/165; G01V 3/17; G01V 3/175; G01V 3/14
See application file for complete search history.

(56) References Cited

U.S. PATENT DOCUMENTS 4,334,227 A    6/1982   Marks
4,866,388 A *  9/1989   Cosman ............... G01V 15/00
                                             324/326
(Continued)

FOREIGN PATENT DOCUMENTS

WO    2015/058012    4/2015

OTHER PUBLICATIONS

International Searching Authority, "Written Opinion of the International Searching Authority" for PCT Patent Application No. PCT/US2017/018212, Aug. 24, 2017, European Patent Office, Munich.

*Primary Examiner* — Son T Le
(74) *Attorney, Agent, or Firm* — Steven C. Tietsworth

(57) ABSTRACT

Systems and methods for locating buried utilities in conjunction with associated electromagnetic marker devices are disclosed. A marker device may include a marker device antenna and an electronic circuit operatively coupled to the marker device antenna. The electronic circuit may include at least two resonant circuits, including a first resonant circuit formed in combination with the marker device antenna for receiving an excitation signal at a first frequency from a marker excitation device. The received excitation signal may be converted into a power supply by a power circuit for powering the electronic circuit. Responsive to the received excitation signal, a processing element provided in the electronic circuit may generate an output signal at a second frequency, which is substantially different from the first frequency. The generated output signal may be tuned by a second resonant circuit and provided to the marker device antenna.

20 Claims, 34 Drawing Sheets

(51) Int. Cl.
*G01V 3/15* (2006.01)
*G01V 15/00* (2006.01)

(56) References Cited

U.S. PATENT DOCUMENTS

| | | | | |
|---|---|---|---|---|
| 5,106,175 A | * | 4/1992 | Davis | G02B 6/447 340/571 |
| 2008/0252449 A1 | * | 10/2008 | Colvero | G01S 13/74 340/540 |
| 2015/0123664 A1 | * | 5/2015 | Olsson | G01V 3/15 324/326 |

* cited by examiner

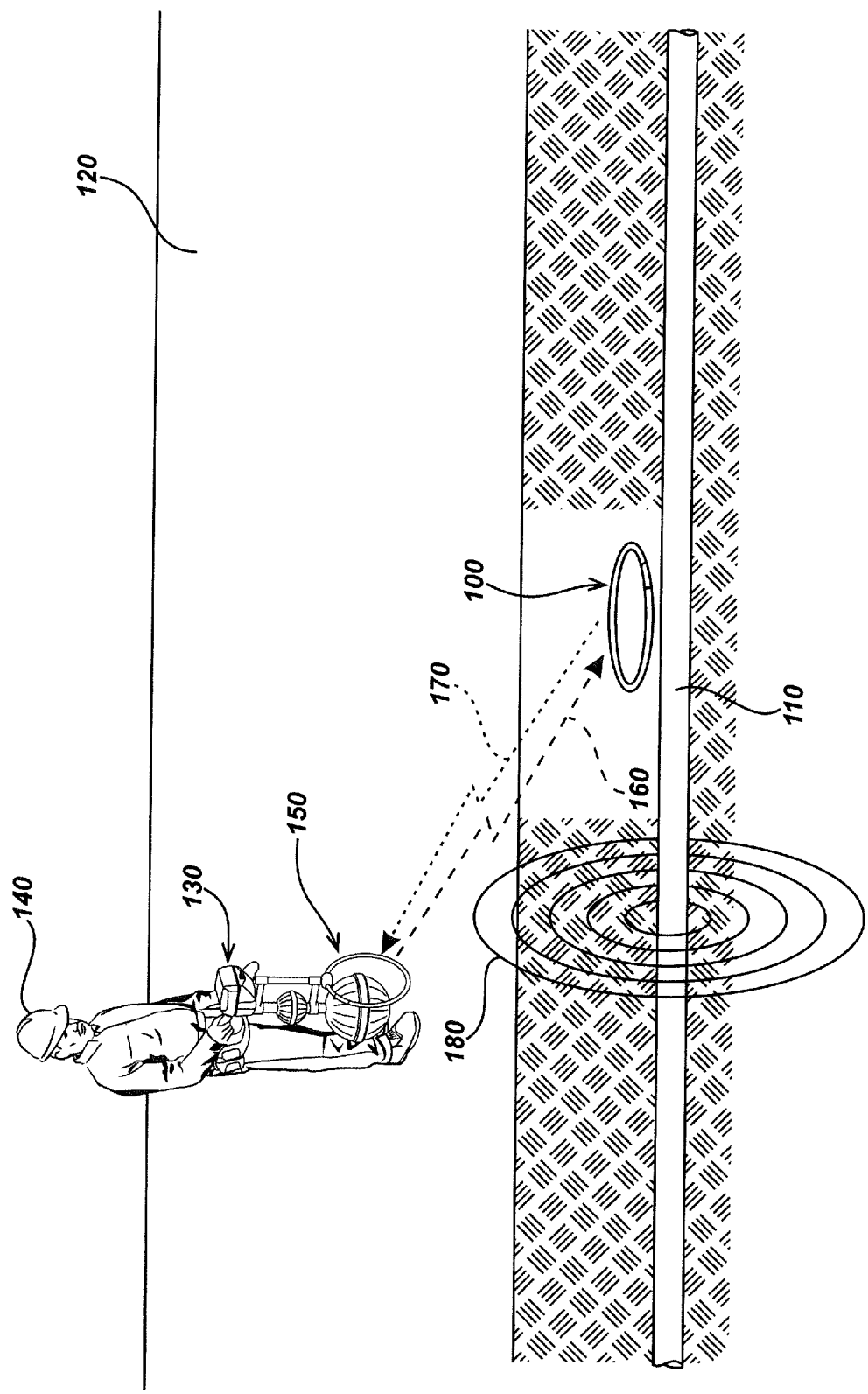

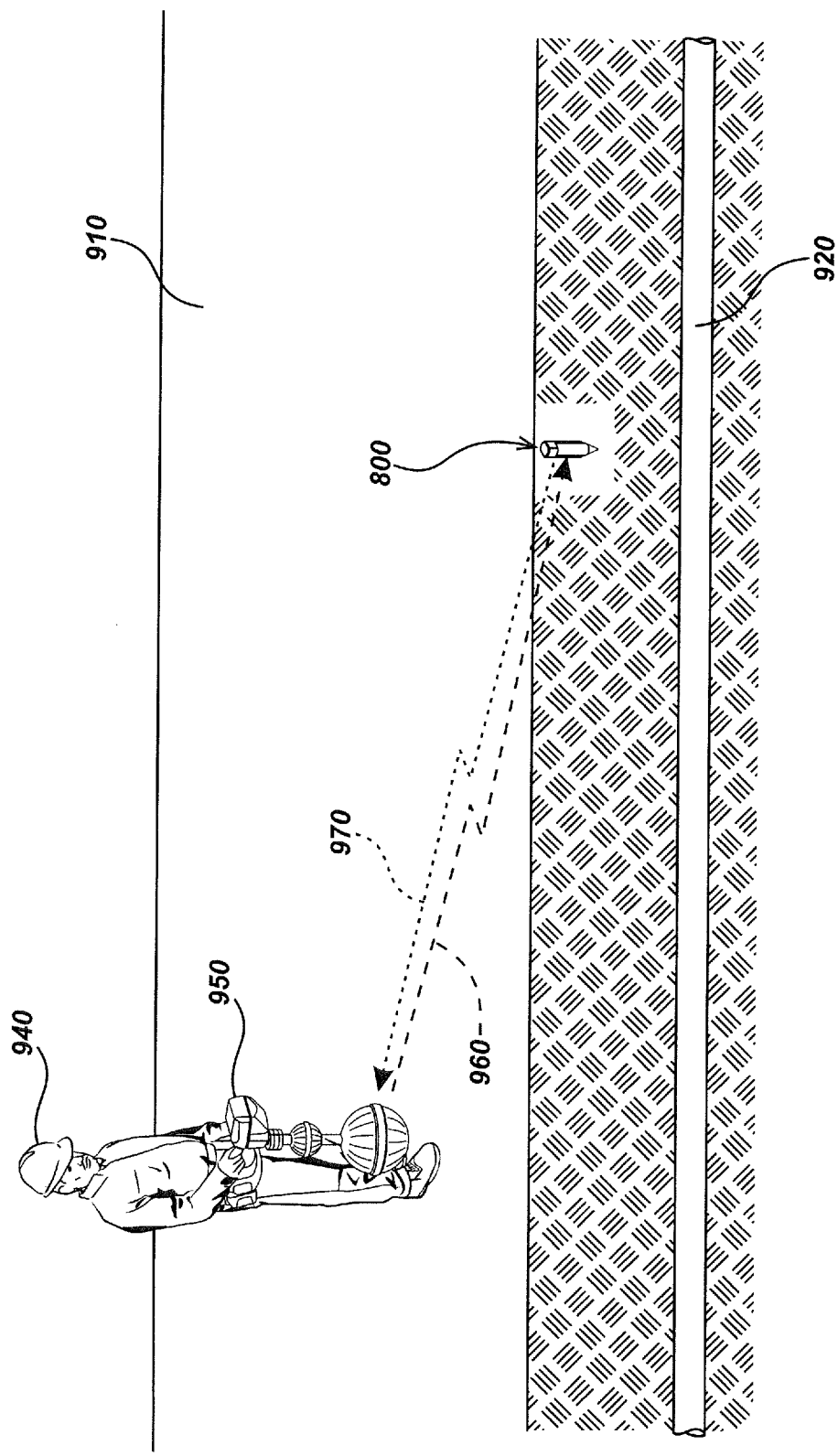

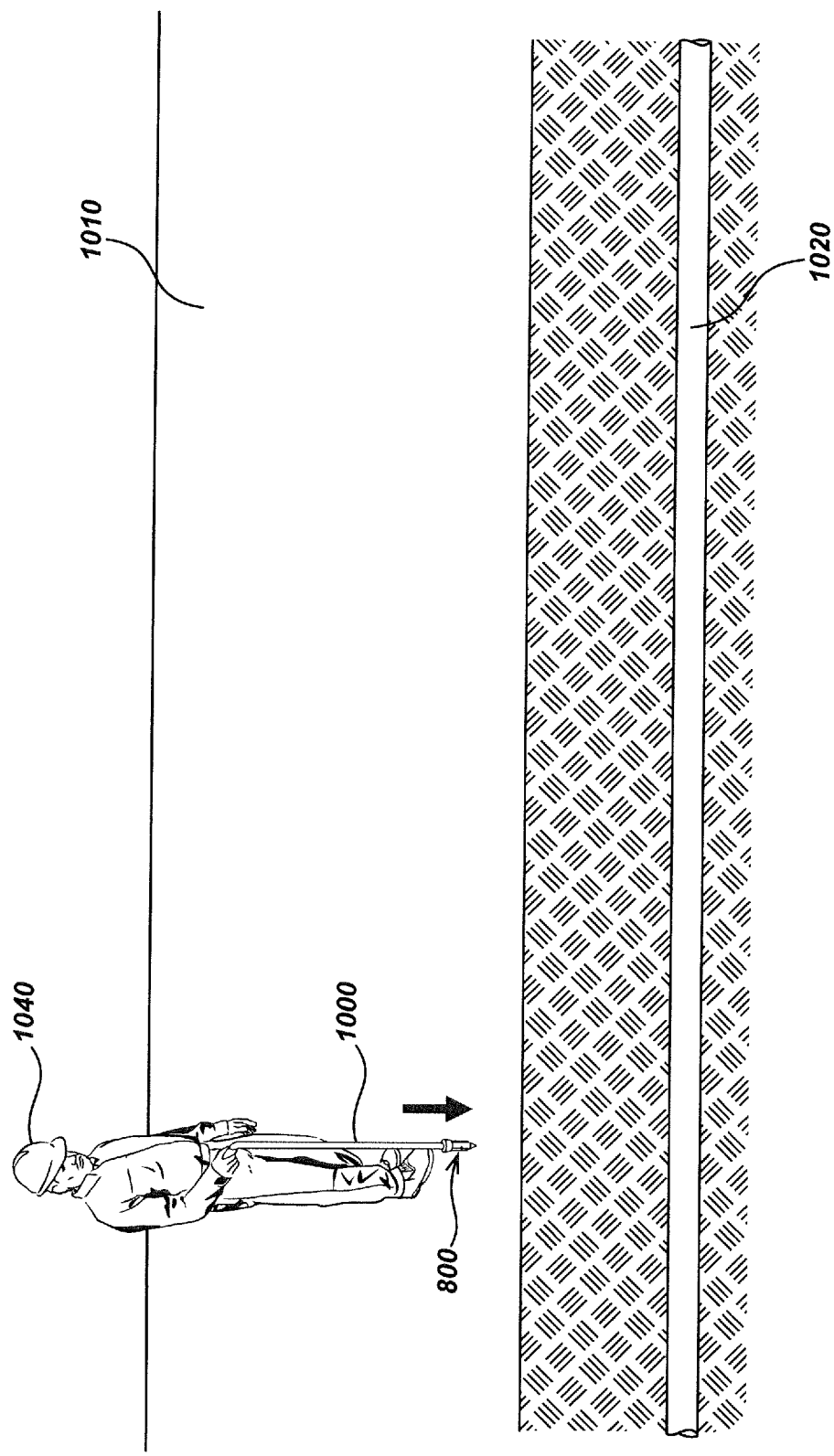

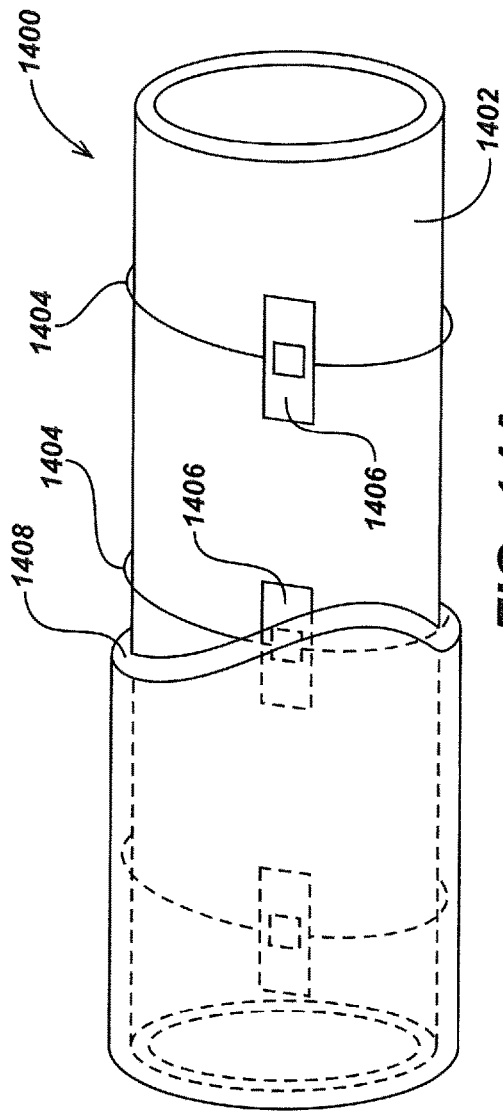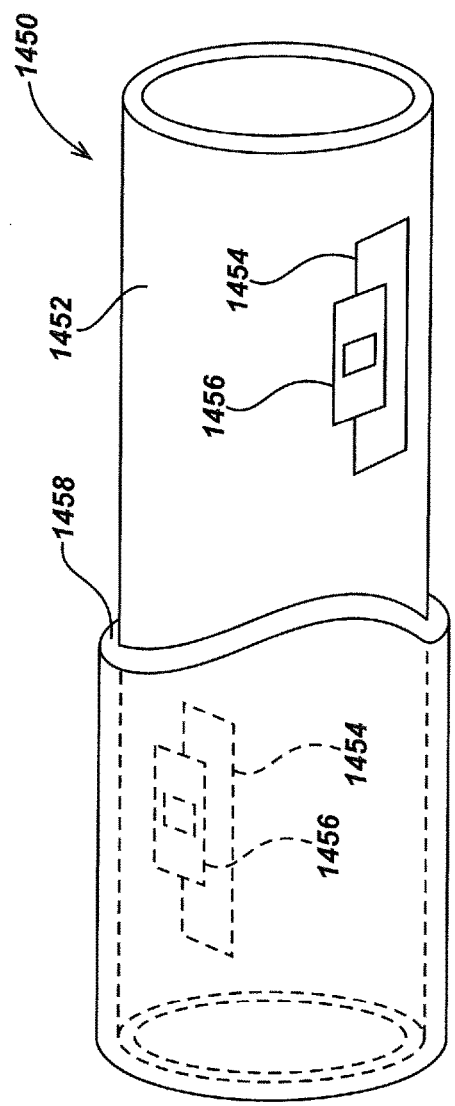

BURIED UTILITY MARKER DEVICES, SYSTEMS, AND METHODS

FIELD

This disclosure relates generally to apparatus, systems, and methods for locating hidden or buried objects using associated marker devices. More specifically, but not exclusively, the disclosure relates to apparatus, systems, and methods for locating buried utilities in conjunction with associated electromagnetic marker devices, which may be used in conjunction with electromagnetic utility locators.

BACKGROUND

The evolving complexity of infrastructure often requires precise location and identification of utility lines (e.g., underground power lines, gas lines, phone lines, fiber optic cable conduits, cable television (CATV) cables, sprinkler control wiring, water pipes, sewer pipes, etc.) for purposes of repair, enhancement, and/or replacement. Such utility lines, collectively and individually referred to herein as "buried objects" or "buried utilities," may be buried in the ground and/or otherwise hidden from normal sight. Construction and/or excavation operations typically require the locations and/or identification of such utility lines be known so as to avoid costly and hazardous destruction of infrastructure (for example, so that a buried natural gas line is not ruptured during excavation of the ground for work on other utilities).

In utility locating operations (also denoted as "locates" for brevity), one or more locating devices, also referred to herein as "buried utility locators," "utility locators," or simply "locators" for brevity, may be carried and moved about a locate area to detect, process, and/or record magnetic field signals for use in determining information associated with the utilities and/or other conductors in the ground. For example, one or more locators may be moved over the ground or other surface by an operator, with each locator receiving magnetic field signals emitted from one or more utilities. In one or more processing elements of the locator, the magnetic field signals are then processed to determine information about the buried utility, such as its position relative to the ground surface, depth, type of utility, geographical location, and the like.

If the buried utilities are conductors that carry their own alternating current electrical signal, they can be traced by detecting emitted magnetic field signals at their correspondingly energized frequency or frequencies, such as 50 or 60 Hz, or harmonics thereof, from underground power cables. This is commonly known as "passive locating" (i.e., detecting magnetic field signals emitted from currents flowing in a utility due to a signal applied to the utility, as in the case of an electrical power signal, or induced in the utility from electromagnetic radiation from power lines, radio transmitters, or other signal sources).

Signals may also be coupled to the utility by a user during a locate operation. These signals have a predefined frequency or frequencies, and may be generated in a device known in the field as a locate transmitter or "transmitter" for short. The output of the transmitter may be directly, inductively, or capacitively coupled to the utility to induce current flow therein. This type of locating is commonly known as "active locating."

In addition, in some locating operations, a device known as a sonde, which includes a magnetic dipole antenna and signal generation module, commonly powered by a battery, is inserted into a pipe, conduit, or other cavity and generates a dipole magnetic field signal that can be detected by the locator. Some locate operations use two or more of these locating techniques at a time, while others rely on a single emitted signal to determine buried utility information. Portable utility locators typically include one or more antennas that are used to detect the magnetic field signals emitted by buried pipes and cables and/or by sondes that have been inserted into pipes.

In addition to the above magnetic field signals, some underground utility installations use marker devices placed adjacent to the utilities. Such marker devices are typically passive markers including a single resonant circuit for operating in a resonance mode responsive to a signal transmitting electromagnetic energy at a specific frequency, which is expected to be re-transmitted at the same frequency for detection of such marker devices. These marker devices lack control over the received electromagnetic energy, which is often affected by its form factor, component construction, manufacturing tolerances, underground environment (e.g., wet or otherwise conductive soil) where the marker devices are placed, etc. This can negatively affect performance of such marker devices and result in an output signal (re-transmitted signal) having a gradually decayed amplitude often undetectable by a receiver (e.g., locator antenna) or detectable, occasionally, with a limited signal range requiring close coupling with the receiver. Further, re-transmission of electromagnetic energy, from the marker device to the receiver, at the same frequency or nearly same frequency of the received signal results in backscattering of the re-transmitted electromagnetic energy at the receiver, resulting in substantial interference making detection of the marker device difficult and/or erroneous. Additional and expensive devices/components are often required for an attempt to reduce backscattering.

Accordingly, there is a need in the art to address the above-described as well as other problems related to marker devices and associated locating systems.

SUMMARY

This disclosure relates generally to apparatus, systems, and methods for locating hidden or buried objects. For example, in one aspect, the disclosure relates to apparatus, systems, and methods for locating buried utilities in conjunction with associated buried utility marker devices (hereinafter referred as "marker devices" or "markers" for brevity).

one aspect relates to marker devices. The marker devices may include a marker device antenna and an electronic circuit coupled to the marker device antenna. The electronic circuit may include two or more resonant circuits, e.g., a first resonant circuit and a second resonant circuit. The first resonant circuit may include resonant/tuning elements such as capacitors, which in combination with the marker device antenna forms the first resonant circuit. At the first resonant circuit, an excitation signal at a first frequency is received from a marker excitation device. The received excitation signal may be converted into a power supply by a power circuit for powering the electronic circuit. Once powered, a processing element and associated electronics in the electronic circuit may generate an output signal responsive to the received excitation signal. This output signal may be received by the second resonant circuit for tuning the output signal and/or providing the tuned output signal to the marker device antenna. The tuned output signal may have an improved signal strength (e.g., higher amplitude than the generated output signal) enabling efficient and accurate detection of the marker device at a receiver end (e.g., at utility locator) with improved signal range.

The marker devices described herein may be configured in a variety of different shapes and form factors according to different embodiments of the subject matter. For example, the marker devices may be in a generally toroidal or loop shape, a ground stake shape, a pipe or tube like shape, and the like. These form factors facilitate better circuit loading/tuning of the marker devices, potentially enhancing their signal reception and transmission capabilities depending on a particular application. One or more housings or other protective enclosures or coatings, etc., may be provided for covering/enclosing the marker devices from ingress of environmental solid and liquid contaminants and to prevent detuning of the marker devices.

The marker devices may be buried in proximity to buried utilities or may be disposed on or within the buried utilities to mark such utilities. The marker devices may, thereafter, be used in conjunction with a utility locator (e.g., handheld utility locator or vehicle-mounted utility locator) and a marker excitation device to locate marked buried utilities. The marker excitation devices described herein may be attached to the utility locator, integrated into the utility locator, or provided as a standalone device in various embodiments.

These and other features, aspects, and advantages of the present subject matter will be better understood with reference to the following description and appended claims. This summary is provided to introduce a selection of concepts. This summary is not intended to identify key features or essential features of the claimed subject matter, nor is it intended to be used for limiting the scope of the claimed subject matter.

BRIEF DESCRIPTION OF THE DRAWINGS

The present disclosure may be more fully appreciated in connection with the following detailed description taken in conjunction with the accompanying drawings, wherein:

FIG. 1A is an exemplary locating system using a marker device embodiment positioned in the ground along with a buried utility.

FIG. 9 illustrates a locate system using the ground-stake marker embodiment of FIGS. 8A and 8B.

FIG. 10 illustrates a stake placement device embodiment in use.

FIG. 14A is a detailed cutaway illustration of a marker device embedded pipe embodiment with multiple marker device antennas and electronic circuits that are not electrically connected to each other.

FIG. 14B is a detailed cutaway illustration of a marker device embedded pipe embodiment with differently oriented and shaped marker device antennas.

DETAILED DESCRIPTION OF EMBODIMENTS

Overview

Figure 1B:
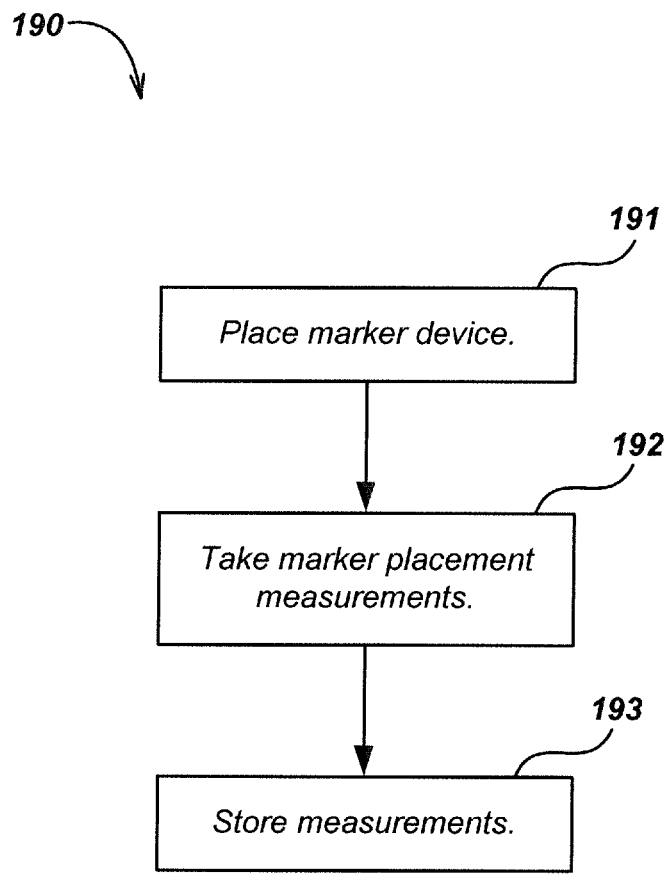
FIG. 1B illustrates an embodiment of a method for storing position and/or other information associated with a marker device.

This disclosure relates generally to apparatus, systems, and methods for locating hidden or buried objects using marker devices. For example, in one aspect, the disclosure relates to apparatus, systems, and methods for locating buried utilities in conjunction with associated electromagnetic marker devices.

Details of the locating devices referred herein, additional components, methods, and configurations that may be used in conjunction with the embodiments described subsequently herein in further embodiments are disclosed in co-assigned patent applications and patents including U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. patent application Ser. No. 12/939,591, filed Nov. 4, 2010, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. patent application Ser. No. 13/851,951, filed Mar. 27, 2013, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL ROUND TRACKING APPARATUS, SYSTEMS AND METHODS; U.S. patent application Ser. No. 14/022,067, filed Sep. 9, 2013, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,145, filed Jul. 29, 2014, entitled UTILITY LOCATING SYSTEMS WITH MOBILE BASE STATION; U.S. patent application Ser. No. 14/446,279, filed Jul. 29, 2014, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. Provisional Patent Application 62/244,658, filed Oct. 21, 2015, entitled SIGNAL KEYING UTILITY LOCATING DEVICES, SYSTEMS, AND METHODS; U.S. patent application Ser. No. 14/949,868, filed Nov. 23, 2015, entitled BURIED OBJECT LOCATOR APPARATUS AND SYSTEMS; U.S. Provisional Patent Application 62/260,199, filed Nov. 25, 2015, entitled UTILITY LOCATING SYSTEMS, DEVICES, AND METHODS USING RADIO BROADCAST SIGNALS; U.S. patent application Ser. No. 15/006,119, filed Jan. 26, 2016, entitled SELF-STANDING MULTI-LEG ATTACHMENT DEVICES FOR USE WITH UTILITY LOCATORS; U.S. Provisional Patent Application 62/295,502, filed Feb. 16, 2016, entitled BURIED UTILITY MARKER DEVICES, SYSTEMS, AND METHODS; U.S. Provisional Patent Application 62/307,365, filed Mar. 11, 2016, entitled UTILITY LOCATOR SUPPORT STRUCTURES; U.S. Provisional Patent Application 62/327,412, filed Apr. 25, 2016, entitled SYSTEMS AND METHODS FOR LOCATING AND/OR MAPPING BURIED UTILITIES USING VEHICLE MOUNTED LOCATING DEVICES; U.S. Pat. No. 9,341,740, issued May 17, 2016, entitled OPTICAL GROUND TRACKING APPARATUS, SYSTEMS, AND METHODS; U.S. Provisional Patent Application 62/350,147, filed Jun. 14, 2016, entitled TRACKABLE DIPOLE DEVICES, METHODS, AND SYSTEMS FOR USE WITH MARKING PAINT STICKS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; and U.S. Pat. No. 9,465,129, issued Oct. 11, 2016, entitled IMAGE-BASED MAPPING LOCATING SYSTEM. The content of each of these patents and application is incorporated herein in its entirety. The above patents and applications may be collectively denoted herein as the "co-assigned applications" or "incorporated applications."

As used herein, the terms "buried objects," "buried utility assets," "buried utilities," "utilities," and "utility lines" include objects located inside walls, between floors in multi-story buildings or cast into concrete slabs, for example, as well as objects disposed below the surface of the ground. In a typical application a buried object is a pipe, cable, conduit, wire, or other object buried under the ground surface, at a depth of from a few centimeters to meters or more, that a user, such as a utility company employee, construction company employee, home-owner, or others want to locate, map (e.g., by surface position as defined by latitude/longitude or other surface coordinates, and/or also by depth), and/or provide a surface mark of using paint, electronic marking techniques, or other identification or mapping techniques. Some non-conductive objects may have associated tracer wires or other conductors buried with them to facilitate electromagnetic locating.

In the context of the present disclosure, the term "position" refers to a location in space which is represented in the form of an absolute position, such as GPS positional coordinates (e.g., Latitude and Longitude), and/or relative position, such as position of a magnetic compass needle relative to an object/location (e.g., buried utility, marker device, landmark, etc.). Further, the term "position" as used herein in association with the marker device(s), buried utilities, and/or other objects includes an orientation (e.g., tilt, rotation, compass needle orientation etc.), depth, and/or elevation of such objects with respect to a reference (e.g., locator, electronic marker device, landmark, ground surface, sea level, etc.). Furthermore, the term "position" may also include other parameters indicative of position/location of such objects typically represented in a three-dimensional (X, Y, Z coordinates or their equivalent) space.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

In one aspect, the disclosure relates to marker devices which may be placed below a ground surface in proximity to buried utilities or on or within the buried utilities. Such marker devices may be energized or excited, at particular times (e.g., during locate operations), using an above-ground marker excitation device to assist in locating corresponding buried utilities. In the case of a plurality of marker devices, the marker devices may be energized simultaneously, sequentially, or selectively based on received signal strength/frequency of the excitation signal, etc. The marker devices may include a marker device antenna for receiving the excitation signal from the above ground excitation device at an excitation signal frequency, and for sending, in response to the excitation signal, a reply or output signal at an output signal frequency, which may be substantially different from the excitation signal frequency. An above ground marker excitation device as disclosed herein may be a standalone marker excitation device, a marker excitation device coupled to a utility locator (e.g., a handheld utility locator or a vehicle-mounted utility locator), or a marker excitation device integrated into the utility locator.

In another aspect, the disclosure relates to marker devices which may be used in conjunction with locating system and methods. Such locating systems and methods may include various locator devices and associated apparatus for determining information regarding utility lines and other locate environment data (e.g., presence or absence of a buried utility line, type of utility, depth in the ground, and the like). The systems and methods disclosed herein may, for instance, include one or more utility locators (e.g., handheld utility locators, vehicle-mounted utility locators, or integrated locators for both sending excitation signals and receiving output signals), transmitter devices, base stations, pipe sondes, and so on. Further details of some such devices and apparatus that may be included in the systems herein are described in the various incorporated patents and patent applications referenced above.

In another aspect, the disclosure relates to marker device(s) used in conjunction with locating systems and mapping systems for identifying and recording the location of buried utilities. For instance, the position of marker devices and position of corresponding utilities may be added to a database corresponding to geographical location from one or more position sensors or systems (e.g., a satellite positioning system module (e.g., GPS module, Galileo system module, GLONASS module, or other satellite-based positioning system module), inertial based positioning system, optical positioning system, or other as described in various incorporated patents and patent applications above) integrated or associated with the locator. Information stored in the database may be accessed to create various maps for assisting users in locating the utilities.

In another aspect, the disclosure relates to marker device(s), which may include an electronic circuit responsible for signal handling (e.g., processing of received excitation signals from and generating output signal provided to the antenna). The electronic circuit may include dual resonant circuits and other circuitries or elements, such as processing elements, memories, and/or other components for carrying out instructions. For instance, such components may be used to communicate information (e.g., position information, utility type, serial number, or other information) from marker devices through signal modulation (e.g., amplitude signal keying (ASK), phase signal keying (PSK), frequency signal keying (FSK), or the like). The electronic circuit may further include a control circuit for selectively enabling or disabling power circuit or other circuit elements depending on various parameters including, but not limited to, signal strength/frequency, and type of information/data to be communicated. Also, the electronic circuit may include timing circuits which may be used in conjunction with control circuit for timer based control of the power circuits or other circuit elements. In some embodiments, the electronic circuit may also include one or more tuning elements (e.g., small value capacitors) controlled and/or adjusted automatically by the control circuit for auto-tuning of the marker device.

In another aspect, the disclosure relates to methods of identifying marker devices and corresponding information using the utility locator and associated positioning system(s), device(s) and/or technique(s). In such methods, positional information (e.g., position, depth, etc.) of a marker device may be detected by a utility locator configured with positioning systems (e.g., GPS or other satellite navigation systems, inertial navigation systems, optical positioning systems, etc.). The detected information may be used to access database containing pre-stored information regarding the marker device and associated utility line or other buried asset in proximity of which the marker device is placed, to obtain the associated utility line information (e.g., position of the utility line, type of the utility line, serial number, characteristics and other information pertaining to the utility line therefrom. For instance, utility type, serial number, and/or other information may be included in the database corresponding to a marker device at a position in space. When the locator detects the presence of a marker device at that location, the database information may be accessed to retrieve information pertaining to corresponding utility line.

In another aspect, the disclosure relates to a high quality factor (referred to herein as high Q) marker devices including an insulating jacket encapsulating a marker device antenna and electronic circuit therein. The insulating jacket may have a predefined thickness (e.g., a thickness of approximately twice the diameter of a marker device antenna conductive core or larger) to provide a physical distance between the marker device antenna/the electronic circuit and the soil or other environment in which the marker device may be buried. The insulating jacket and the physical distance created therefrom may reduce capacitive coupling of signals (at both loading of received excitation signal and broadcasting of output signal) with the soil or other conductive elements in the soil, thereby reduce detuning of the marker device. The insulating jacket may be made of materials having a low dielectric constant properties (e.g., polypropylene (2.2-2.36), polyethylene (2.25), polystyrene (2.4-2.7), polytetrafluoroethylene (2.25), or other materials having a similarly low dielectric constant number). The insulating jacket of the various embodiments described herein may further protect sensitive electronics and materials from corrosive and otherwise damaging elements in the soil or locate environments.

In another aspect, the disclosure relates to marker device(s) designed in the shape of a toroid or a loop. Such loop shaped marker device includes a marker device antenna and an electronic circuit, which may be included on a printed circuit board (PCB) in the loop shaped marker device. The marker device antenna may have one or more turns, each of which may be individually encapsulated by an insulating jacket.

In another aspect, the disclosure relates to a plurality of marker devices which may be strung along or placed at predefined or random intervals in the utility line or in proximity to a utility line or other buried assets. Such marker devices may be energized either simultaneously or individually, or the marker devices, in certain embodiments, may be selectively enabled or energized depending upon various parameters including signal strength/frequency of the excitation signal received from the marker excitation device.

In another aspect, the disclosure relates to marker device(s) generating the output signal in multiple different frequencies depending upon various parameters, such as kind of data to be communicated (e.g., serial number, data defining position of the marker device, and the like). Further, the marker device(s) may be selectively programmed to enable or disable different circuit elements in the marker device(s) depending upon usage, function, and/or operating status, etc. of such elements, to save power.

In another aspect, the disclosure relates to a marker device designed as a ground-stake. The ground-stake marker device may include an outer insulating jacket and/or other outer shell shaped like a nail or ground-stake allowing a user to readily push, hammer, or otherwise place the marker device into the ground. The ground-stake shaped insulating jacket may encapsulate a marker device antenna, which is a loopstick antenna in this example, comprising a series of conductive windings wrapped about a ferrite core. The windings of the loopstick antenna may connect electrically to an electronic circuit responsible for signal handling (e.g., processing of received excitation signals from and generating output signal provided to the antenna). The electronic circuit may include transceiver circuitry and may additionally include other circuitries. The electronic circuit may be included on a printed circuit board (PCB). A ground-stake marker placement tool is disclosed to assist a user in placing the ground-stake marker device into the ground. The ground-stake placement tool may include a vertical mast with a handle on the proximal end held by a user and a stake retaining structure about its distal end. The stake retaining structure may be configured to allow a ground-stake marker device to be released upon action of the user (e.g., turn of the handle, press of a button, or the like).

In another aspect, the disclosure relates to a pipe sleeve marker device. A pipe sleeve marker device may be shaped to be seated about a pipe or other utility line such that the utility line may pass through the marker device. Such a pipe sleeve marker device may include interior and exterior insulating layers with a number of turns of conductive windings or other conductive element and at least one connected electronic circuit positioned in between. The interior and exterior insulating layer may, for instance, be tube shaped and sized to seat about the exterior of a length of pipe. Interior and exterior insulating layers may be comprised of dielectric materials (e.g., polypropylene (2.2-2.36), polyethylene (2.25), polystyrene (2.4-2.7), polytetrafluoroethylene (2.25), or other materials having a similarly low dielectric constant number) further dimensioned to reduce capacitive coupling of signals to either conductive elements in the surrounding soil or other environment as well as environment or substance flowing within the pipe or utility line. Such embodiments may also use or be comprised of polyvinyl chloride (PVC), acrylonitrile butadiene styrene (ABS), and/or other non-conductive pipe materials. Some embodiments may use materials with a higher dielectric constant. In some embodiments, pipe sleeve marker devices may be used as fittings in securing together separate lengths of pipe or other utility lines.

In another aspect, the disclosure relates to a marker device embedded in a pipe typically made of a non-conductive material (e.g., plastic). Such a marker device embedded pipe may include an interior pipe length onto which a number of turns of conductive windings or other conductive element and at least one connected electronic circuit may be seated. An exterior pipe length may be extruded or otherwise fixed to the outside of the interior pipe length, securing wire turns and electronic circuit or circuitries in between. Interior and exterior pipe lengths may be comprised of dielectric materials (e.g., polypropylene (2.2-2.36), polyethylene (2.25), polystyrene (2.4-2.7), polytetrafluoroethylene (2.25), or other materials having a similarly low dielectric constant number) further dimensioned to reduce capacitive coupling of signals to either conductive elements in the surrounding soil or other environment as well as environment or substance flowing within the marker device embedded pipe. Various antenna configurations and orientations may be used in pipe sleeve marker device embodiments and/or marker device embedded pipe embodiments.

In another aspect, the present disclosure relates to a marker device built onto a printed circuit board (PCB). The PCB marker device may include a marker device antenna and an electronic circuit. An overmold layer may encase the PCB, the marker device antenna, and the electronic circuit providing protection from corrosive or damaging external elements as well as provide an insulating layer. The overmold layer may have a predefined or predetermined thickness, for example, a thickness of approximately twice the diameter of a conductive core of the marker device antenna or larger to provide a physical distance between the marker device antenna/electronic circuit and the soil or other environments in which the marker device may be buried. The thickness of the overmold layer, and the physical distance created therefrom, may reduce capacitive coupling of signals (at both loading of received excitation signal and broadcasting of output signal) with the soil or other conductive elements in the soil, thereby reducing detuning of the PCB marker device.

In another aspect, the disclosure relates to means for implementing the above-described methods and/or system or device functions, in whole or in part.

In another aspect, the disclosure relates to instructions stored on a non-transitory medium for implementing the above-described apparatus, systems, or methods, in whole or in part.

Various additional aspects, features, and functionality are further described below in conjunction with the appended Drawings.

Example Embodiments

Turning to FIG. 1A, an example locate system embodiment using a marker device in accordance with aspects of the present disclosure, such as loop marker device embodiment 100, is illustrated. In this example, one or more hidden or buried utilities, such as utility line 110, is buried below the ground surface 120, with loop marker device 100 at a defined position in the ground relative to the utility 110. The marker device 100 may correspond to a loop marker device 300 as illustrated and described in detail with FIGS. 3A-3C or to other marker device embodiments as described subsequently herein or in the incorporated applications. The system and methods associated with FIG. 1A may further apply and/or share elements and features with the various other marker devices, marker embodiments, and associated electronic circuits described herein (e.g., marker device 710 of FIG. 7, marker device 800 of FIGS. 8A-10, marker device 1200 of FIGS. 12A-12D, marker device embedded pipe 1300 of FIGS. 13A-13D, marker device embedded pipe 1400 of FIG. 14A, marker device embedded pipe 1450 of FIG. 14B and electronic circuit 400 of FIG. 4).

The ground surface 120 may be of dirt or grass, a roadway, a sidewalk, a building floor, and the like over which the locator is moved during a locate operation. The marker device 100 and the various other marker device embodiments disclosed herein may be resonant high quality factor (high "Q") devices optimized to reduce detuning due to capacitive coupling of signals with the marker device's environment. For example, marker device 100 and the various marker device embodiments disclosed herein may include a dielectric element encapsulating its marker device antenna, thereby providing a physical distance between the marker device antenna and surrounding environment sufficient to reduce capacitive coupling of signals to the soil or other conductive environments, as well as to further reduce detuning of the marker device. Such a dielectric element may, for example, be a jacket of polypropylene or other insulating material with similar dielectric properties.

The system of FIG. 1A may further include a utility locator 130 carried by a user 140 for detecting and measuring magnetic field signals (e.g., signal 180 emitted from the buried utility 110 and signal 170 generated from the loop marker device 100). A marker excitation device 150, which may be an excitation transmitter, may be operatively coupled to the locator 130, to generate and send an excitation signal 160 to the loop marker device 100. The marker excitation device 150 may include an excitation device antenna, which may have different orientations according to various embodiments of the subject matter.

Figure 2A:
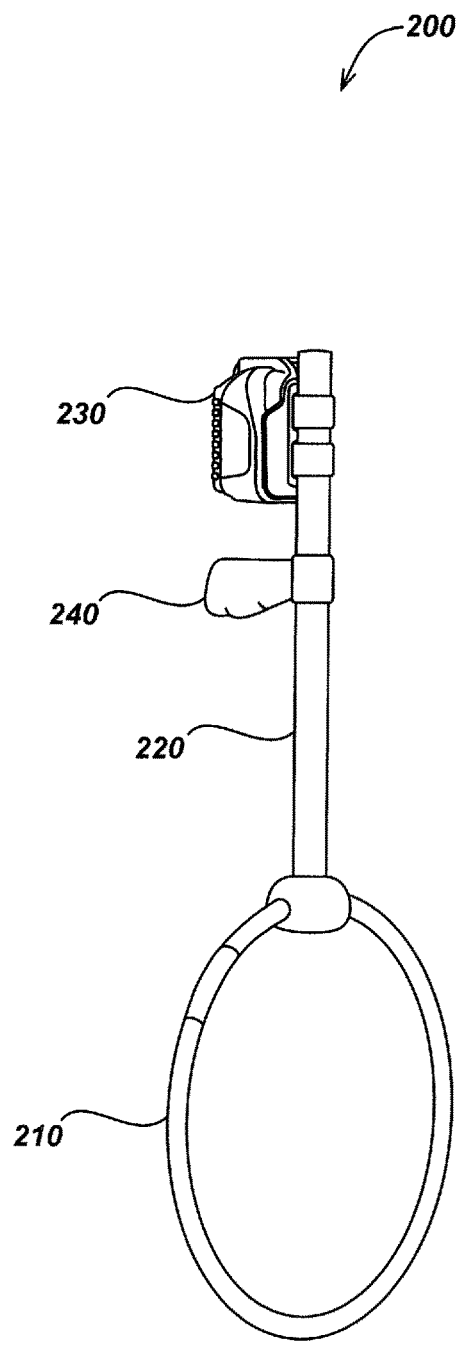
FIG. 2A illustrates a stand-alone marker excitation device embodiment with a vertically oriented excitation device antenna.

For example, as shown in FIG. 1A, the excitation device antenna may be designed in the shape of a loop oriented in a vertical orientation (e.g., excitation device antenna 210 of FIG. 2A). In this orientation, the loop shaped excitation device antenna may achieve a better signal coupling with the loop marker device when the loop shaped marker excitation device is at one of the possible offset positions which break the orthogonality between the vertically positioned loop shaped excitation device and the horizontally placed loop marker device buried below the ground surface 120. In some examples, the orientation of excitation device antenna may be horizontal (e.g., excitation device antenna 210 of FIG. 2B). The horizontal orientation of the loop shaped excitation device may have a better signal coupling with the loop marker device and minimal or no signal interference. In other implementations, the orientation of the excitation device antenna may be angularly adjustable (e.g., adjustable excitation device antenna 210 of FIG. 2C).

The excitation signal 160 generated by the marker excitation device 150 may be a continuous or pulsed RF signal for energizing or "pinging" marker device 100. Marker device 100 may include an electronic circuit for receiving the excitation signal 160, extracting energy, such as in the form of DC power converted from the excitation signal to generate a power supply to power itself, such as when tuned to the frequency of the excitation signal 160, and then to further generate and send an output magnetic field signal 170 for detection by the locator via the marker device antenna. Output signal 170, when detected and processed by the locator 130, may be used to indicate the presence of a marker device 100 to the locator 130 and, in some implementations, may also provide data stored in the marker device 100, and/or access data regarding the marker device and associated utility at the corresponding location.

In an exemplary embodiment, the frequency of output signal 170 may be generated by dividing down the excitation signal 160 frequency. For example, the excitation signal 160 may be divided down by a predefined value, such 128 (or other divisors), to generate the output signal 170. For example, if the input signal is at 13,560,000 Hz, the output signal would then be 105,937.5 Hz. Other frequencies and divide ratios may alternately be used in various embodiments based on particular operating environments, regulatory constraints, device constraints (e.g., power reduction, etc.), signal loss, and the like.

The output signal 170 may be tuned to have an improved signal strength (e.g., high amplitude than the generated output signal) enabling efficient and accurate detection of the marker device with improved signal range (e.g., 2 meters or more). Further, the output signal 160 may be generated in multiple different frequencies depending upon various parameters including the type of data to be communicated. For example, the output signal may be generated at first frequency for communicating a serial number, and at a second frequency for communicating data defining position of the marker device, and the like.

The locators may detect magnetic field signals 180 emitted from buried utility 110 to locate the utility line 110 using locating methods/functionality as described in the various incorporated applications with respect to locators and their configuration and operation. For example, signal 180 emitted from utility line 110 may be inherently generated from the line (e.g., due to normal current flow in a conductor, such as in a buried power line). Alternately, or in addition, current flow may result from the electromagnetic coupling of one or more radiated signals (e.g., broadcast radio signals) to the utility line, and/or current flow may optionally be induced or directly coupled to utility line 110 through use of a transmitter device and associated clamp, inductive coupler, and the like (not shown).

The transmitter may generate and output a current signal for coupling to one or more utilities at a desired frequency or frequencies with a predefined waveform or waveforms. Details of embodiments of such transmitter devices, couplers, and other associated elements and methods of passive and active magnetic signal generation and coupling to underground utility lines are disclosed in the incorporated applications.

Signals 180, associated with utility 110, may be detected by the utility locator 130 using one or more locator antenna coils and/or antenna coils arrays (typically in the form of two or more antenna arrays, such as antenna arrays including omnidirectional and/or gradient antenna coils, dodecahedron antenna arrays, and/or other polyhedron or general antenna arrays such as are described in the incorporated applications). The received signal 180 may be processed by one or more processing elements in the locator to determine information associated with the buried utility 110 such as its depth, location (relative to the ground surface 120), current flow in the utility, presence of other utilities or conductive objects, and the like.

In other locate operations and system embodiments, such as in embodiments where the utility line is of a non-conductive material (e.g., plastic pipes, etc.), signals may not be coupleable from a transmitter device, other signal generating device, or other signal source, and current may not flow inherently therein. In such operations, marker devices, such as marker device 100, may be placed near the utility line during installation or later to assist in locating the utility's position in the ground, without the need for traditional locating via emitted magnetic field signals from the utilities (some non-conductive utilities use conductor tracer wires or other conductors—the marker device embodiments herein may be used in conjunction with traditional locating of these utilities or in place of traditional locating).

A marker device embodiment such as marker device 100 of FIG. 1A and/or other embodiments described subsequently herein, may utilize the method embodiment 190 as illustrated in FIG. 1B. This method may be used after placement of the marker device to store marker placement measurements corresponding to the location of the marker device and or associated utility line for subsequent locate operations. The placement of the marker device will typically be underground near or on or within a utility line or other utility asset(s) to be marked for assistance in subsequent locate operations. Placement may occur during installation of a utility line, pipeline surveys, and/or during other excavation or construction operations.

Method embodiment 190 may include step 191 where the marker device is placed in a target position, such as near the utility line and below the ground. This positioning may be identified exactly at the time of placement, may be captured via an image, GPS receiver, and/or other placement identification mechanisms, or the marker may merely be put in adjacent to the utility (e.g., placed or thrown in a hole by an installer). In a second step 192, a set of marker placement measurements of the marker device may be determined. Marker placement measurements may include position (e.g., latitude/longitude and/or other like absolute position measurements, orientation/tilt, or relative positional data) and depth in the ground of the marker device or the associated utility line. The marker placement measurements may further include other locate information including, but not limited to, utility type marked, size, color, imagery of the install, and so on.

These measurements may be determined through various devices and systems including, for example, a locator, surveying systems and devices, satellite navigation systems and sensors (e.g., GPS, GLONASS, etc.), cameras, and the like, and/or by physical measurements (e.g. tape measurements) after placement of the marker device and before its burial. In one embodiment, measurements may be taken using a laser-based measurement device(s)/elements (e.g., LiDAR, radar, sonar, laser tape measuring device, laser tagging device, laser rangefinder, etc.), which may either be integrated into the utility locator and/or marker excitation device, or may be provided as a separate device coupled to or used in conjunction with the utility locator and/or marker excitation device.

Figure 1C:
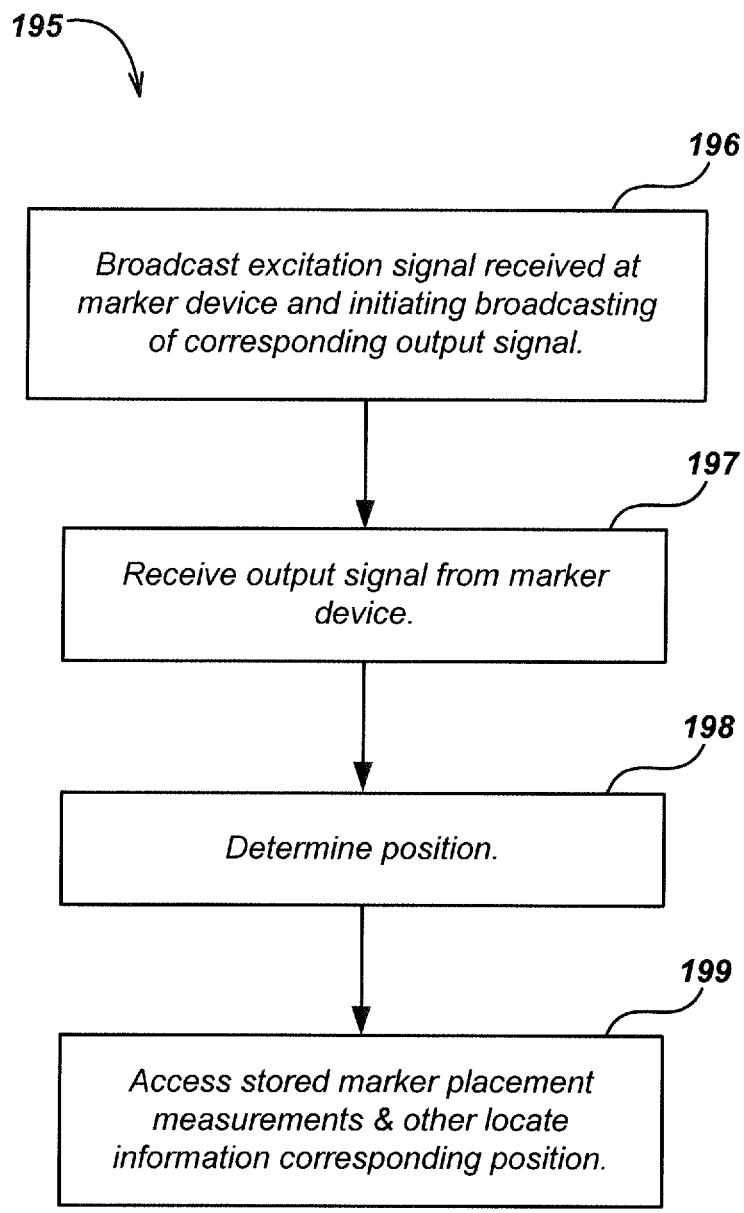
FIG. 1C illustrates an embodiment of a method for accessing marker placement measurements and locate information based on detecting marker device information at a locator position.
Figure 1D:
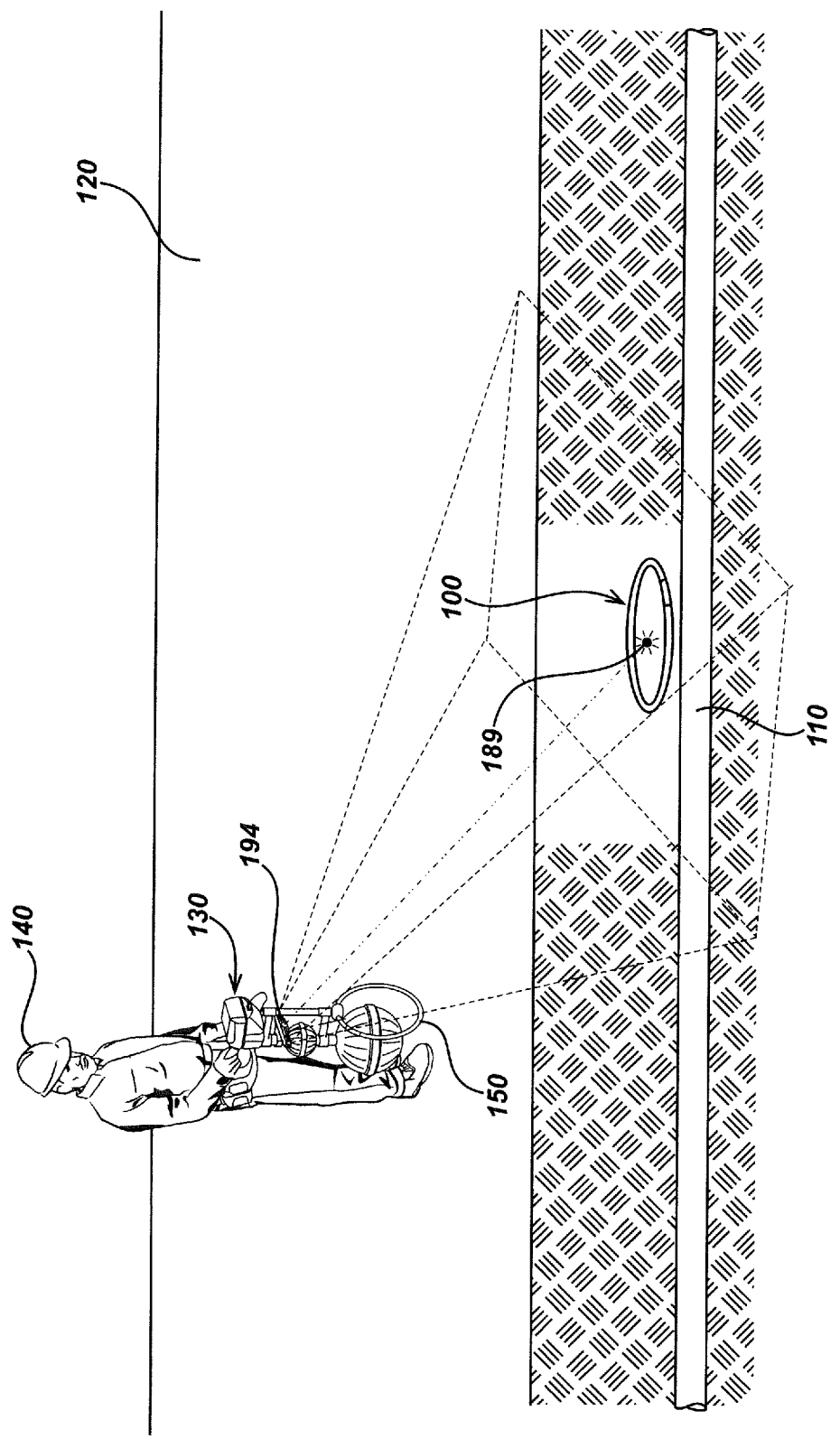
FIG. 1D illustrates an embodiment of a locator with an integrated marker measurement device embodiment.

One exemplary embodiment for measurement is illustrated in FIG. 1D. As shown, a marker measurement device 194 integrated into a locator 130 includes a laser element emitting a laser beam 189, which may be pointed towards the center of the marker device 100 for taking measurements. Measurements may be taken in several ways which would be apparent to a person skilled in the art. The measurement device 194 may include additional elements such as imaging elements (e.g., cameras) for capturing images of placed marker devices, and other elements that may assist in positioning the laser and/or accurately taking measurements. Additional measurements for the marker devices may also be performed using other devices including, but not limited to, the locator 130, at the same time or subsequently. The locator 130 may also take measurements (e.g., position, depth, etc.) and/or images or video of the buried utility being marked with an attached or separate camera, as well as measurements and/or images/video of other nearby utilities or objects (e.g., underground objects, such as traceable tape, sonde, and the like, and/or aboveground objects, such as landmarks, sidewalks, and the like). A microphone and associated audio recording device may be used to record an annotation of the placements in conjunction with the above-described information. The microphone and recorder may be integral with or separate from the locator 130.

In step 193, information/measurements from step 192 may be stored in a non-transitory memory or database, which may either be an internal memory of the locator or an external memory/remotely located memory communicatively coupled to the locator. Such information may be accessible to utility locators and may be utilized for subsequent locate operations performed at the same location. Locators in subsequent locate operations may access stored marker placement measurements and/or other locate information based on position/location (e.g., from satellite navigation or other position systems and sensors), images, or other information associated with a detected marker device.

Turning to FIG. 1C, method embodiment 195 illustrates details of locating a marker device at the locator and accessing stored marker placement measurements and/or other locate information. With method 195, one or more marker devices may be assumed to be already placed, typically in the ground near a utility line or other utility asset, and may have corresponding marker placement measurements as described in, for example, method 190 of FIG. 1B and/or other locate information for each marker device. Such marker placement measurements and other locate information may be accessed by the locator. For example, a database containing such measurements and information may be on the locator and/or accessed remotely through other connected system devices (e.g., smart phone, laptop computer, base station, or the like).

Method 195 may include step 196 where an excitation signal is broadcasted from a marker excitation device, which may be integral with or separate from the locator. The broadcasted excitation signal is received at the marker device via a marker device antenna, and, in response to the received excitation signal, a corresponding output signal may be generated by the marker device. This output signal is then broadcast by the marker device via the marker device antenna. In step 197, the output signal may be received at the locator. In step 198, a current position of the locator may be determined via positioning systems and sensors (e.g., from a GPS or other satellite or terrestrial positioning system signal, inertial positioning elements, and the like). In step 199, marker placement measurements and other locate information may be accessed based on marker device detected at step 197 and corresponding location determined at step 198.

In other marker device embodiments, marker devices may use signal modulation (e.g., encoded via amplitude signal keying, phase signal keying, or other signal keying scheme) to communicate various related information (e.g., utility type, latitude and longitude coordinates or other position information, depth of the marked utility, serial number, tilt and/or orientation of the marker device within the ground, measured underground parameters such as temperature, soil moisture, soil conductivity, chemical information, and the like) in the marker device output signal. Signals may be sent on multiple frequencies with different data types and/or modulations used for different frequencies in some embodiments. Example embodiments may include circuitry such as is described in incorporated U.S. patent application Ser. No. 14/516,558, filed Oct. 16, 2014, entitled ELECTRONIC MARKER DEVICES AND SYSTEMS.

In some locate operations and system embodiments, marker device excitation signals may be generated by a separate marker excitation device. For instance, a standalone marker excitation device of FIGS. 2A-2C, an accessory marker excitation device of FIG. 2D, an integrated excitation device of FIG. 2E, and/or a vehicle-mounted excitation device of FIG. 2F may be used to generate excitation signals to one or more marker devices in various implementations.

As illustrated in FIG. 2A, a standalone marker excitation device embodiment 200 may have a vertically oriented excitation device antenna embodiment 210, having a predetermined effective area, so as to provide range of excitation signals transmitted therefrom to reach marker devices in the ground. The excitation device antenna 210 of FIG. 2A may, for example, be a coil antenna, though alternative embodiments having other shapes, configurations, types, quantities, and orientations of antenna elements may be used. A mast 220 may extend vertically above the excitation device antenna 210 to a connected battery 230 and handle 240. Battery 230 may be operatively coupled to provide electrical power to signal generating circuitry (not shown in FIG. 2A) further connected to the excitation device antenna 210 and concealed within mast 220. The handle 240 may allow the marker excitation device 200 to more readily be carried by a user. The stand-alone marker excitation device 200 may include controls to perform functions described herein (e.g., on/off switch, frequency or frequencies selection, and so on) not specifically illustrated in FIG. 2A.

Figure 2B:
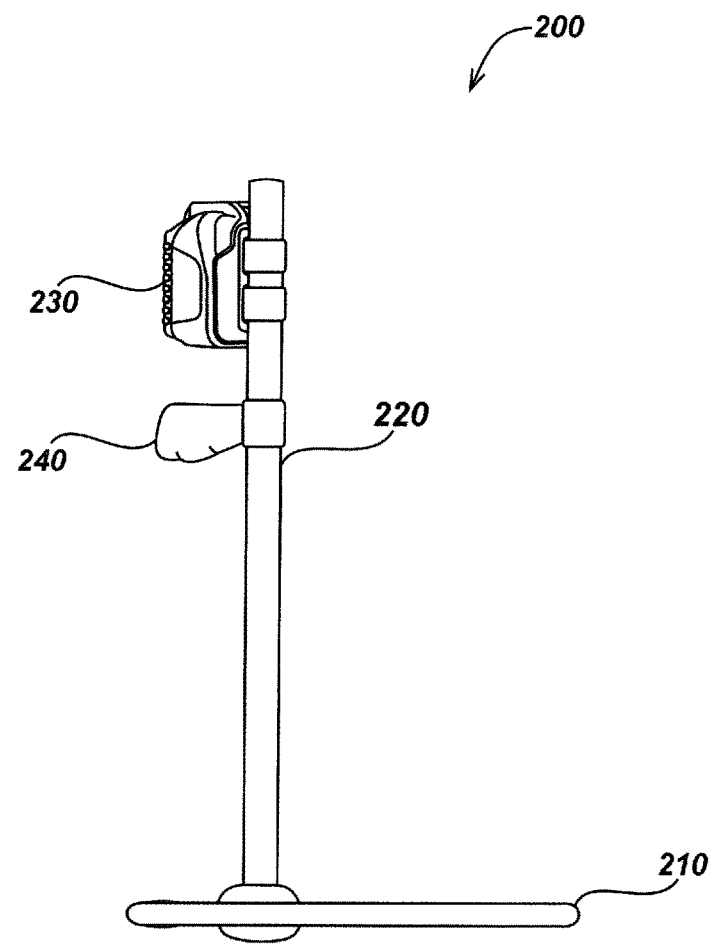
FIG. 2B illustrates a marker excitation device embodiment with a horizontally oriented excitation device antenna.
Figure 2C:
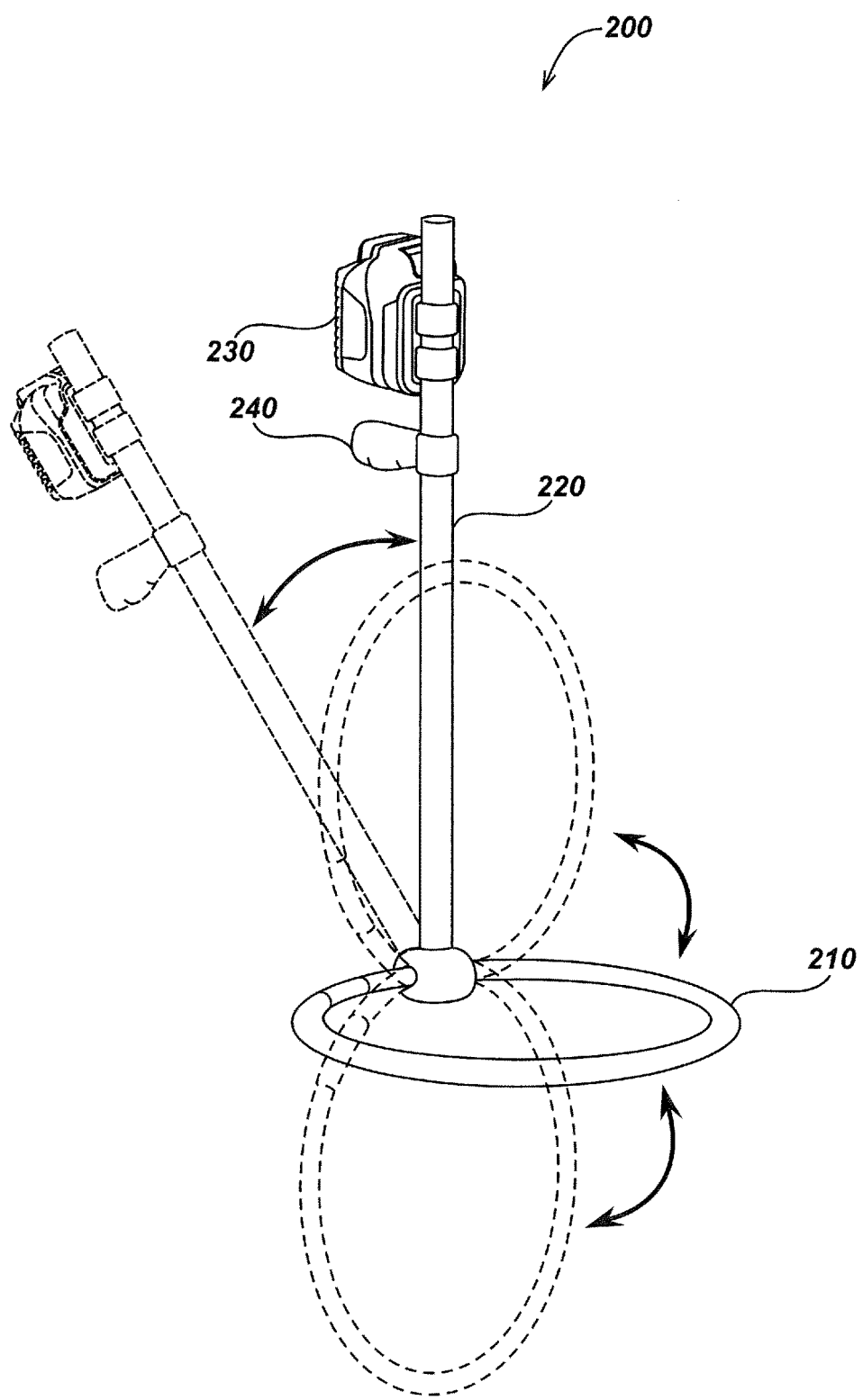
FIG. 2C illustrates a marker excitation device embodiment with an adjustable orientation excitation device antenna.

In other embodiments, the marker excitation device 200 may have a horizontally oriented excitation device antenna 210 (as shown in FIG. 2B), or angularly adjustable excitation device antenna 210 and/or angularly adjustable mast 220 (as shown in FIG. 2C).

Figure 2D:
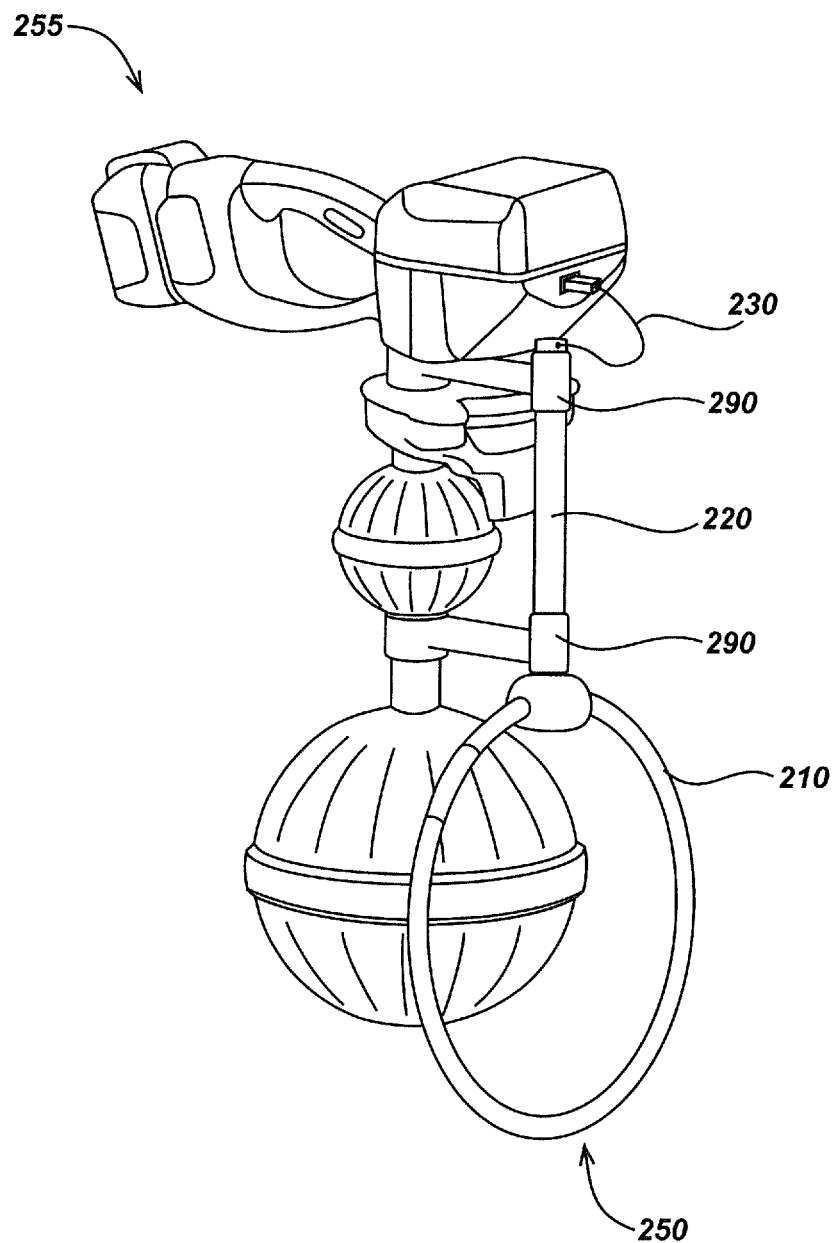
FIG. 2D illustrates an accessory marker excitation device embodiment.

Turning to FIG. 2D, an accessory or attachment marker excitation device 250 may be mechanically and/or operatively coupled to and function through controls of a locator 255. Accessory marker excitation device 250 may have an excitation device antenna 210 of sufficient effective area to provide range in excitation signals generated therefrom to reach marker devices in the ground. The excitation device antenna 210 of FIG. 2D may be a coil antenna. In alternative embodiments other shapes, configurations, quantities, and orientations of excitation device antennas may be used. A mast 220 may extend vertically above the excitation device antenna 210. A wire connector 230 may electrically connect accessory marker excitation device 250 (and excitation device antenna 210 and internal signal generating circuitry, not shown) to locator 255.

Power to marker excitation device 250 may be provided from a power supply, such as a battery, of the locator 255. In alternative embodiments, power may be provided additionally or solely by one or more batteries included on the marker excitation device. Furthermore locator 255 may be configured to control aspects of marker excitation device 250 operation as described herein (e.g., power on/off, frequency or frequencies to be transmitted, and the like) by wired or wireless means via one or more wireless communications modules (e.g., Bluetooth, Wifi modules, cellular data connections, and the like). In some embodiments, such controls may alternatively be located on the marker excitation device 250.

One or more brackets 290 may be located along mast 220 allowing the marker excitation device 250 to mechanically secure to the locator 255. The brackets may be configured to release and allow the marker excitation device 250 to be disconnected and removed from locator 255 when desired, such as for transport or storage. Although the excitation device antenna 210 has been illustrated as vertically oriented in FIG. 2D, it is to be understood that the excitation device antenna 210 attached to the locator 255 may have other orientations, such as a horizontal orientation or an angularly adjustable orientation (e.g., as described above with respect to standalone marker excitation device).

Figure 2E:
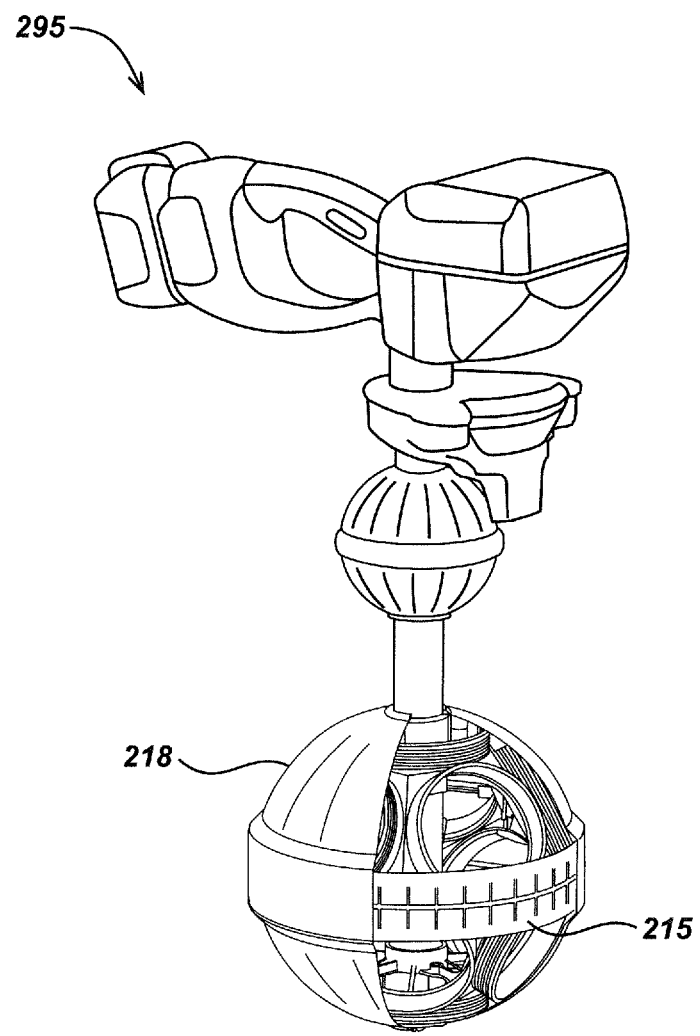
FIG. 2E illustrates a locator with an integrated marker excitation device embodiment.

Turning to FIG. 2E, a marker excitation device may be integrated in a locator 295. In this integrated embodiment, the excitation device antenna and other associated elements may be configured in the form of a ring 215 mounted, for example, inside the lower antenna node 218 of the locator 295. In other embodiments the marker excitation device may be placed in other positions on or in the locator 295. Embodiments of a locator with integrated marker excitation device are described in detail in the incorporated applications, such as in U.S. patent application Ser. No. 14/516,558, filed Oct. 16, 2014, entitled ELECTRONIC MARKER DEVICES AND SYSTEMS.

Figure 2F:
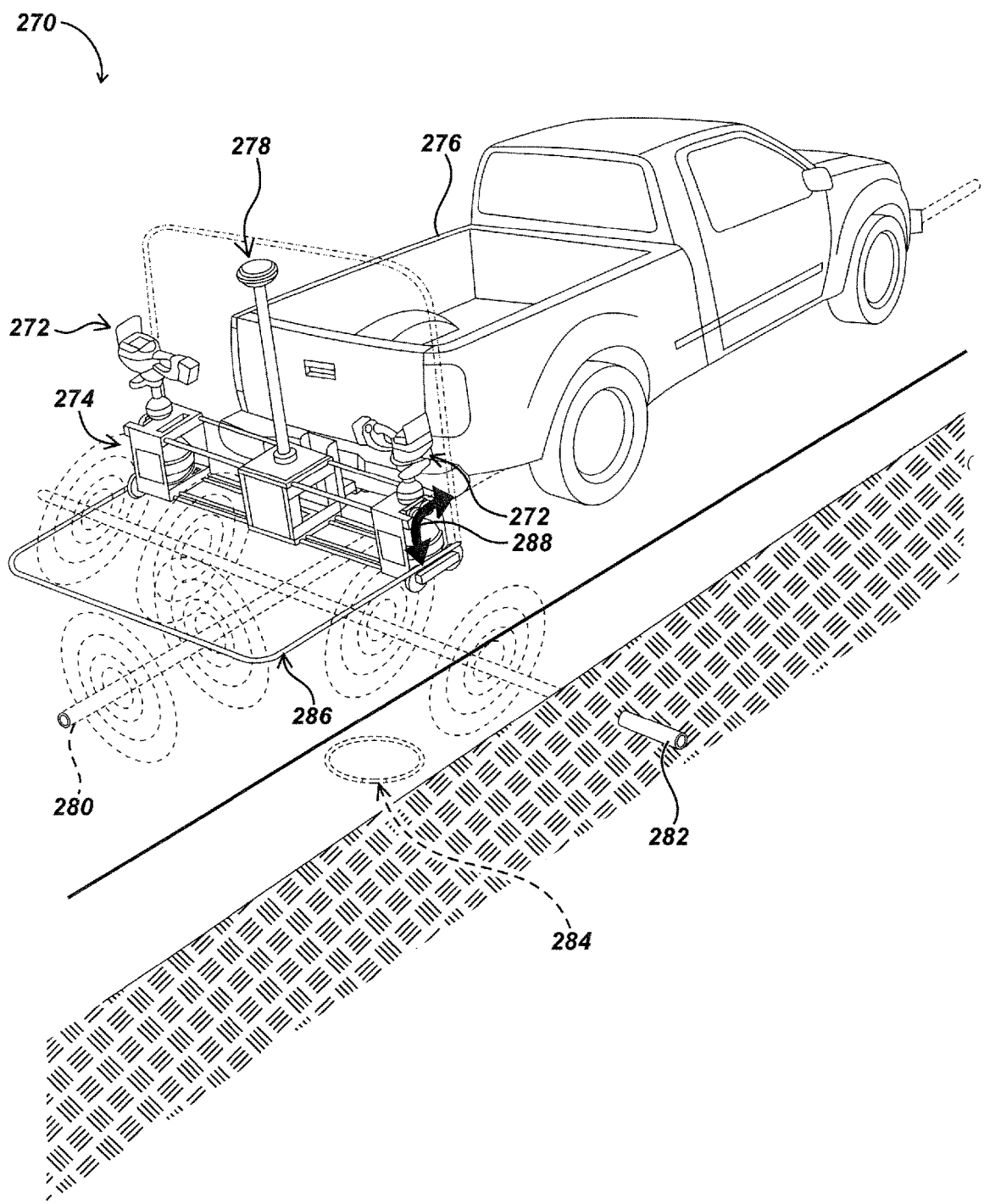
FIG. 2F illustrates a marker excitation device embodiment used in conjunction with vehicle-mounted locating devices.

Turning to FIG. 2F, in some system implementations, a marker excitation device embodiment may be mounted on or in a vehicle, and may be operatively coupled to one or more vehicle-mounted utility locators. For example, in some utility locating and mapping operations, one or more utility locators may be secured to a vehicle for detecting presence of buried utilities and identifying data pertaining to the buried utilities. Examples are described in the incorporated U.S. Patent Application 62/327,412, filed Apr. 25, 2016, entitled SYSTEMS AND METHODS FOR LOCATING AND/OR MAPPING BURIED UTILITIES USING VEHICLE-MOUNTED LOCATING DEVICES. In such systems, a marker excitation device may be added thereto to transmit a signal or signals, thereby exciting marker devices as well as inducing signal onto buried utility lines for the purpose of locating and mapping utility lines and associated marker devices which are buried in the ground.

As illustrated in FIG. 2F, a vehicle mounted locating system 270 may include the utility locators 272 secured to a mounting fixture 274. The mounting fixture 274 may further be secured to a vehicle 276, for example, in an exemplary embodiment via a trailer hitch on vehicle 276. Electrical power may be transmitted to various electronics on the vehicle mounted locating system 270 via trailer hitch wiring (not illustrated in FIG. 2F). Such powered electronic components of the vehicle mounted locating system 270 may include signal processing and or generating circuitry, powering of GPS 278 and/or other included electronics, and additional brake lights on mounting fixture 274 (not illustrated), and the like.

The GPS system 278 may include real time kinematics (RTK) for determining or refining position corresponding to the locating data acquired by utility locators 272 and mapping of utility lines such as utility lines 280 and 282 as well as any marker devices, such as marker device 284. In some embodiments, signals emitted by utility lines may be actively or passively induced onto the utility line. As illustrated in FIG. 2F, an active signal or signals may be induced into utility lines 280 and/or 282 via a marker excitation device 286. The marker excitation device 286 may further be adjustable at other angles along direction arrow 288, as well as be secured and stowed upright in a vertical position. In other embodiments, one or more marker excitation devices may be used with a vehicle mounted locating system that may be secured to the vehicle mounted locating system and/or the vehicle itself in various different orientations.

Figure 3A:
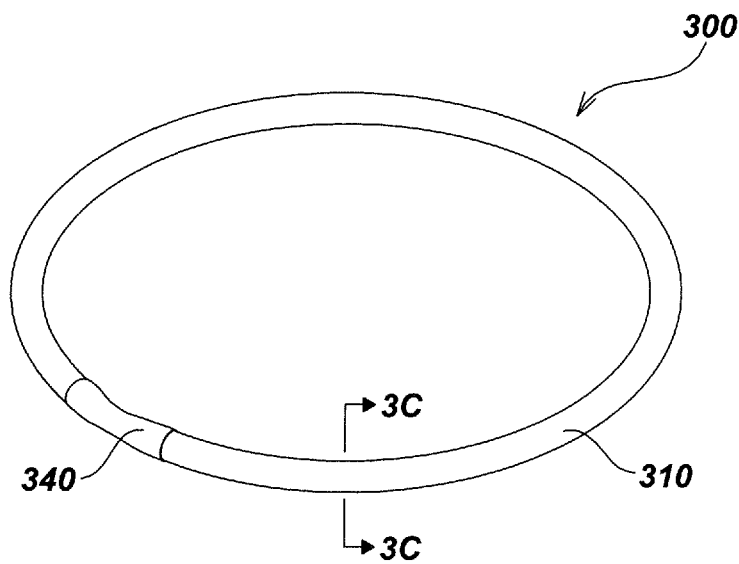
FIG. 3A is an isometric view of a loop style marker device embodiment.
Figure 3B:
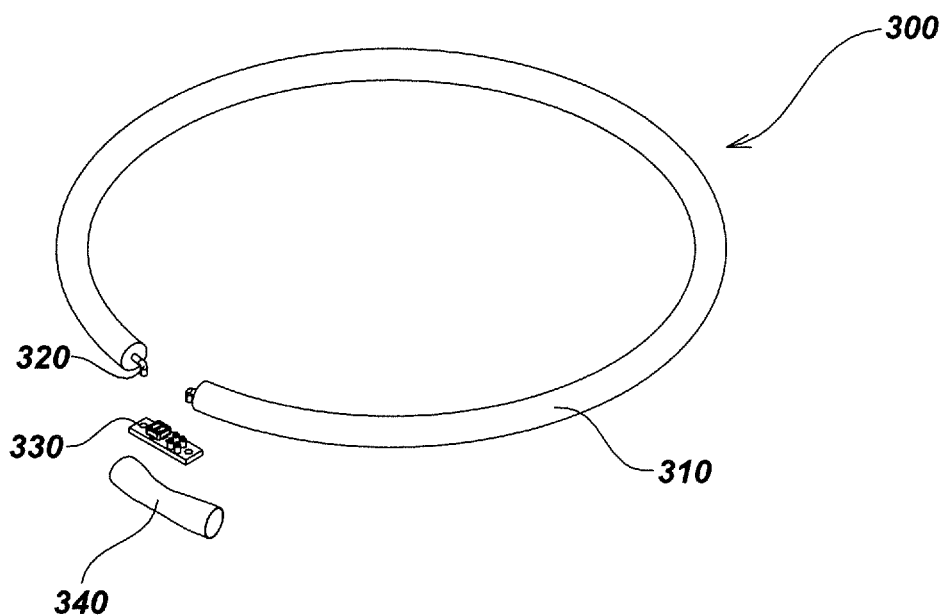
FIG. 3B is a partially exploded view of the marker device embodiment of FIG. 3A.

Turning to FIGS. 3A and 3B, an exemplary marker device embodiment 300 is illustrated. Marker device 300 may include an insulating jacket 310 enclosing a marker device antenna 320, and a cover element 340 enclosing the electronic circuit 330. The insulating jacket 310 and the cover element 340, described herein, may be collectively referred to as "housings," or may be individually referred to as "housing." In some embodiments, a combined/common housing (not shown) may be used for enclosing both the marker device antenna 320 and the electronic circuit 330. Embodiment 300 is in the exemplary form of a circular loop; however, other embodiments may include alternate shapes (e.g., ovals, rectangular/square shapes, etc.).

In the context of the present subject matter, the term "housing" may include any kind of enclosure/casing, cover, coating, etc., to cover or protect the marker device and associated antenna, components, circuits, or elements. The housings 310, 340 may be used to insulate the marker device antenna and/or the electronic circuit from the underground environment to seal it from ingress of water or other fluids, and may also provide a protective covering to reduce damage to the marker device antenna and/or the electronic circuit due to impact of objects under the ground, cutting tools, and the like. The housing 310, i.e., the insulating jacket, may further be used to protect the marker device antenna 320 from detuning by selecting appropriate materials. For example, in an exemplary embodiment, the housings 310, 340 may include a dielectric layer of polypropylene or other materials having a similar dielectric constant to provide a predefined capacitance between the marker device antenna/the electric circuit and the ground. Example materials with similar dielectric constants to polypropylene may include, but are not limited to, polyethylene (2.25), polystyrene (2.4-2.7), polytetrafluoroethylene (2.25), or other similar materials. Materials of higher dielectric constant may be used in alternate embodiments, and in embodiments where insulation is not necessary (e.g., in placements within walls or other spaces where the marker is surrounded by air), material of other dielectric constants may alternately be used.

As shown in FIG. 3B, the marker device antenna 320 may include an outer conductor or conductive cover or coating of copper or a copper alloy (or other high conductivity materials such as silver, gold, etc.) to enclose or cover a structural core made of steel or other structural materials to maintain shape and provide rigidity. The copper and steel may be copper-clad steel or other conductive material disposed over a structural material. In some embodiments, both the outer cover and the core of the antenna 320 may be made of copper-clad steel or other conductive materials. In some embodiments the conductor may be pure copper, copper alloys, or other high conductivity materials without separate structural internals.

In an exemplary embodiment, the marker device antenna 320 may be shaped as a loop antenna comprising a single individually insulated antenna coil (single turn). Alternate embodiments may include multiple turns. The multiple turns may be wound adjacent or over each other or, in alternate embodiments may be helically wound.

In structural core embodiments, the mechanical strength of the steel (or other structural materials adjacent the conductor) in the copper-clad steel antenna 320 may aid in maintaining the desired shape of marker device antenna 320 and overall marker device 300 while minimizing impedance at high operating frequencies due to the well known skin effect of current flow. A printed circuit board (PCB) 330, as shown in FIG. 3B, contains the electronic circuit components and traces. The PCB may be coupled electrically about either end of the coil of marker device antenna 320 as shown in FIG. 3B.

As illustrated in the FIGS. 3A and 3B, the marker device 300 may be toroidal in shape, thereby maximizing effective antenna area given a particular length of marker device antenna 320. The specific diameter of the marker device 300 and other loop antenna embodiments described herein may be selected to provide a desired range needed to receive signals from a locator or other marker excitation device, as well as to transmit signals of sufficient power level to a locator. For example, in underground marking applications, a marker device, such as marker device 300, may a circular loop shape of approximately 20 to 30 cm in diameter. As noted previously, in alternative embodiments, loop antennas may be formed into shapes other than a toroid. The dimensions of such non-toroidal shaped marker device antennas may be adjusted to provide appropriate aperture and range in signals as required by a particular application and installation environment.

Figure 3C:
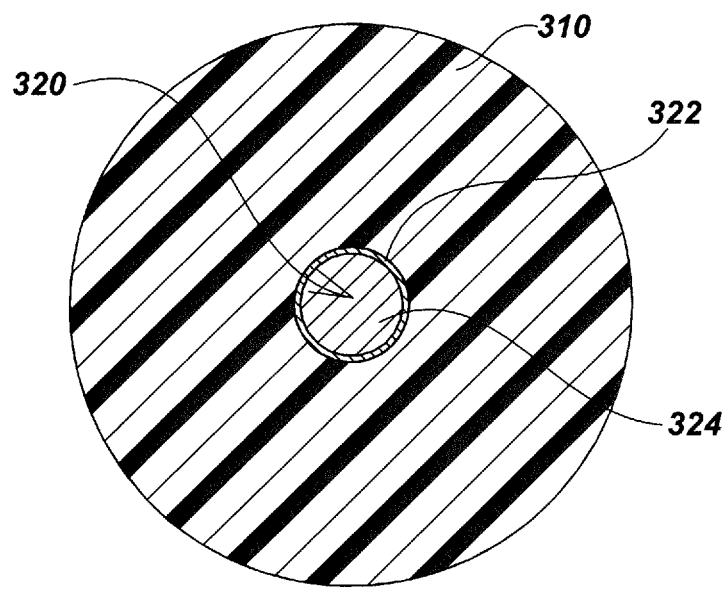
FIG. 3C is section view of the marker device embodiment of FIG. 3A along line 3C-3C.

Turning to FIG. 3C, the marker device antenna 320, which may comprise copper-clad steel, may have an outer conductor 322 surrounding a structural core of steel 324. The insulating jacket 310 encapsulating the marker device antenna 320 may be of a predetermined thickness, given the dielectric constant of selected jacket materials, to reduce capacitive coupling of signals to conductive soil or other surrounding environment and further detuning of the marker device 300 to a desired amount. The thickness of the jacket may be determined based on various factors/parameters, including but not restricted to, frequencies being utilized. Insulating jacket 310 and cover element 340 may further protect against corrosive or other damaging elements of the soil or other environment in which marker device 300 is placed. In an exemplary embodiment, the dielectric material jacketing the marker device antenna may be of a thickness of approximately twice the diameter of the antenna conductor or larger. For example, the insulating jacket 310 may be of ⅜ to ½ inch polypropylene encapsulating an antenna 320 of 10 to 12 gauge copper-clad steel.

The electronic circuit, when coupled with the marker device antenna, such as the loop antenna or loopstick antenna configurations or other antennas described herein, may include circuitry for receiving excitation signals from the marker device antenna or antenna(s), processing and powering the marker device from received excitation signals, and generating corresponding output signals and applying the output signal to the marker device antenna(s).

Figure 4:
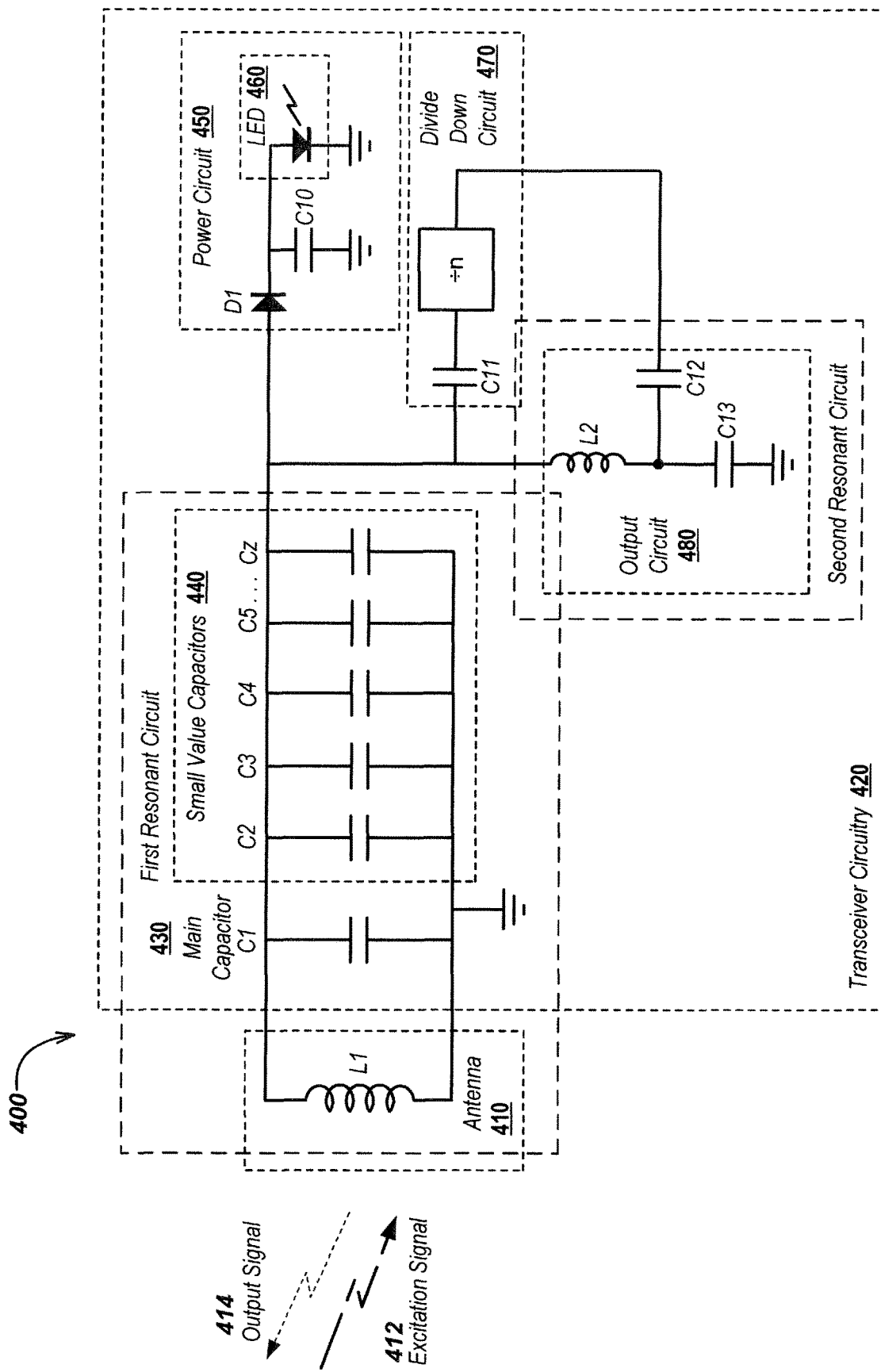
FIG. 4 is a circuit diagram of an electronic circuit of a marker device embodiment.

FIG. 4 illustrates an exemplary transceiver circuitry embodiment in accordance with various aspects. The transceiver circuitry 420 of FIG. 4 may correspond with the transceiver circuitry of marker device 100 of FIG. 1, marker device 300 of FIGS. 3A-3B, marker device 710 of FIG. 7, marker device 800 of FIGS. 8A-10, marker device 1200 of FIGS. 12A-12D, marker device embedded pipe 1300 of FIGS. 13A-13D, marker device embedded pipe 1400 of FIG. 14A, and/or marker device embedded pipe 1450 of FIG. 14B as described herein, or of other marker devices in accordance with the present disclosure. Further, the marker device antenna 410 of FIG. 4 may correspond to the loop antenna 320 of FIGS. 3A-3C, the multi-loop antenna 600 of FIG. 6A, the marker device 630 of FIGS. 6B and 6C, loopstick-type antenna 820 of FIG. 8B, conductive windings 1204 of FIGS. 12B-12D, conductive windings 1304 of FIGS. 13B-13D, conductive windings 1404 of FIG. 14A, antenna 1454 of FIG. 14B, and/or other antenna configurations.

Figure 3D:
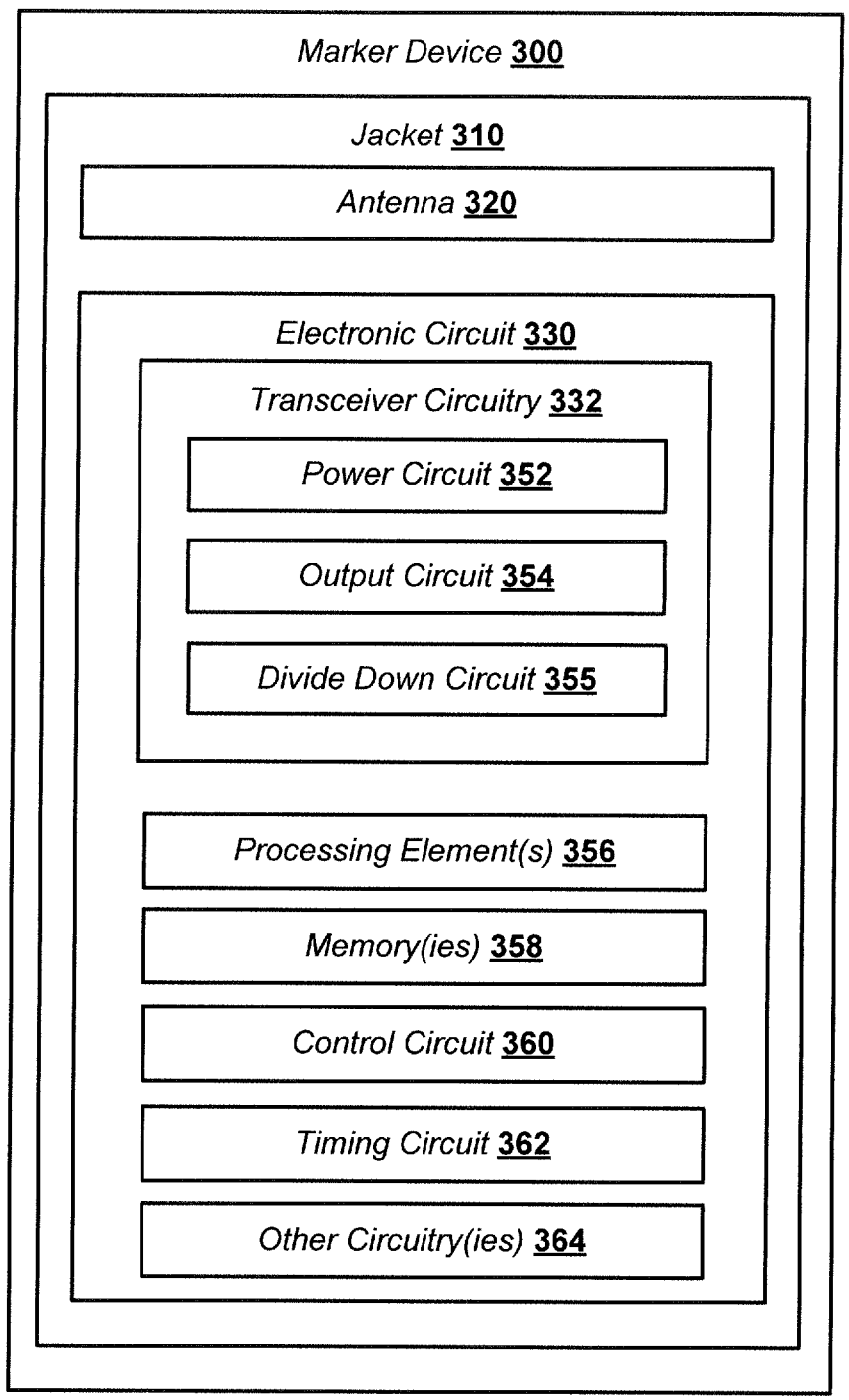
FIG. 3D is a block diagram of a marker device embodiment.

Turning to FIG. 3D, a block diagram of an exemplary marker device embodiment is illustrated. As shown, the marker device 300 may include a marker device antenna 320, an electronic circuit 330, and an insulating jacket 310 encapsulating the marker device antenna 320 and the electronic circuit 330 therein. The insulating jacket 310 may include a dielectric layer for reducing capacitive coupling to the ground or other environment in which the marker device is embedded. The dielectric layer may have a thickness of about twice the diameter of a conductive core of the marker device antenna or larger. The dielectric layer may be made of materials, such as polypropylene, polyethylene, polystyrene, polytetrafluoroethylene, or a combination thereof. The marker device antenna 320 may be a loop antenna comprising a single turn or a plurality of turns, which may be helically wound about a form. Further, the marker device antenna 320 may include a conductive core made of a copper or copper alloy encapsulating a structural core made of steel or other structural materials.

The electronic circuit 330, which is responsible for signal handling (i.e., processing of received excitation signals from and generating output signal provided to the antenna and related functions) may include a power circuit 352, an output circuit 354, one or more processing elements 356, memories 358, and other circuitries or components 364 for carrying out instructions. Such components may be used to communicate information (e.g., position information, utility type, serial number, or other information) from marker devices through signal modulation (e.g., amplitude signal keying, phase signal keying, frequency signal keying, or the like).

In operation, the marker device antenna 320 may receive an excitation signal at a first frequency from a marker excitation device. The received excitation signal may be converted by the power circuit 352 into a power supply for powering the electronic circuit. The signal may then be processed by one or more processing elements 356 to generate an output signal, at a second frequency different from the first frequency. This output signal may be received by an output circuit 354 for providing an output signal to the marker device antenna 320. In some embodiments, the processing elements 356 may generate the output signal at a plurality of frequencies based on various parameters including type of data to be communicated (e.g., serial number, data defining position of the marker devices, etc.). The processing element(s) 356 may include, for example, a microcontroller or other programmable elements having programmed instructions to generate a modulated output signal (e.g., modulated using ASK, PSK, FSK, etc.) to send data (e.g., serial number of the marker device, data defining a position of the marker device, etc.).

The electronic circuit 330 may further include a control circuit 360 for selectively enabling or disabling different circuits or circuit elements in the electronic circuit 330 based on, for example, signal strength/frequency of the excitation signal, duty cycle, coding, type of information/data to be communicated, usage of such elements, their function, operating status, etc., to save power. The electronic circuit 330 may also include one or more tuning elements (e.g., capacitors) controlled and/or adjusted automatically by the control circuit 360 for auto-tuning of the marker device 300. Further, the electronic circuit 330 may include a timing circuit 362 that may be used in conjunction with control circuit 360 for timer based control of the power circuits 352 or other circuit elements of the electronic circuit 330.

FIG. 4 illustrates an exemplary electronic circuit embodiment of the marker device. As shown, the electronic circuit 400 may connect electrically to the marker device antenna 410 and may include transceiver circuitry 420 and/or other circuitries for signal handling such as powering marker device 400, processing of received excitation signals 412 from the marker device antenna 410, and generating output signal 414 further provided to the marker device antenna 410. The electronic circuit components may, in some embodiments, be included on a PCB, such as the PCB 330 of FIG. 3B. Marker device 400 and the electronic circuit may be used in the embodiments as described and illustrated in FIGS. 3A and 3B, FIG. 8B, FIGS. 12A-12C, FIGS. 13A-13C, FIG. 14A, and FIG. 14B. As shown in FIG. 4, an excitation signal 412, which may correspond to signals 160 of FIG. 1A and/or other excitation signals described herein, may be received at the marker device antenna 410 at a first frequency.

Excitation signal 412 received at the marker device antenna 410 may form a first resonant circuit containing a marker device antenna 410 (L1), main capacitor 430 (C1) and a series of small value capacitors 440 (C2-Cz). In some embodiments, the first resonant circuit, including all tuning elements, i.e., capacitors (e.g., main capacitor 430 (C1) and small value capacitors 440 (C2-Cz)), may originally be set to below the resonant frequency and, during tuning, small value capacitors 440 (C2-Cz) may be removed one at a time until proper tuning of the marker device 400 is achieved.

Figure 5:
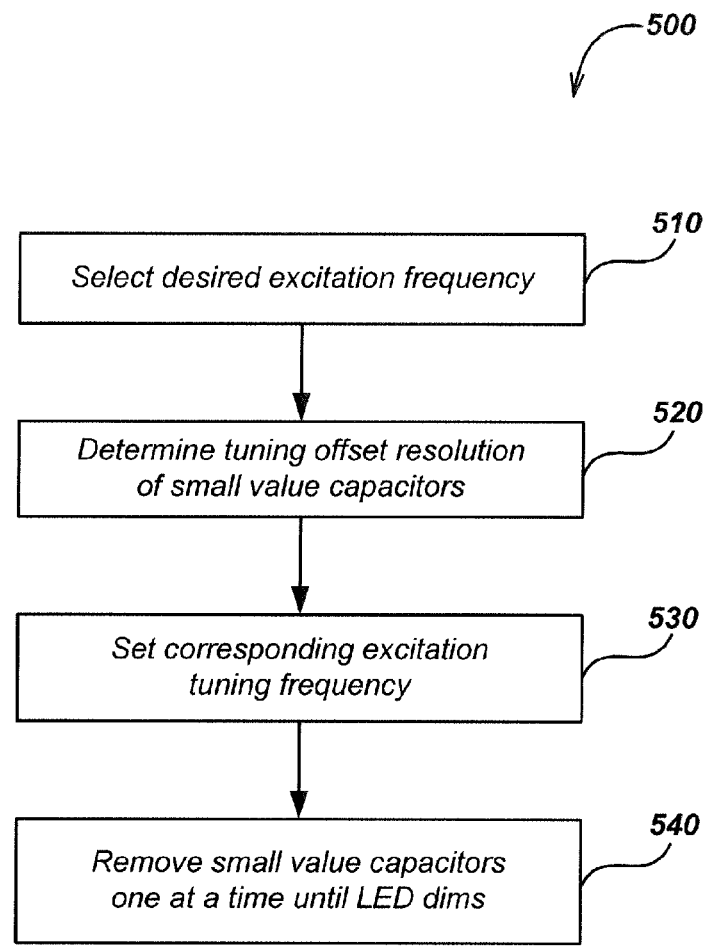
FIG. 5 is an embodiment of a method for tuning a marker device embodiment with an electronic circuit as illustrated in FIG. 4.

Such a tuning method is further described in method embodiment 500 of FIG. 5. The transceiver circuitry 420 may further include a power circuit/supply 450 having a diode D1 and capacitor C10. The diode D1 may have low forward drop and low capacitance attributes. An LED 460 may further be included on power circuit 450 used to both protect against overloading and diminishing the quality factor of resonant circuits in the transceiver circuitry 420 of marker device as well as to be used as a visual indicator during tuning as described subsequently in method 500 of FIG. 5.

The transceiver circuitry 420 may further include a divide down circuit/element 470 and output circuit/element 480. The divide down circuit 470 may include capacitor C11 and a frequency divider configured to divide the excitation signal 412 by integer n. The divided down signal may be provided to the output circuit 480. The output circuit 480 may be a second resonant circuit having inductor L2 and capacitors C12 and C13. Resonating of output circuit 480 (interchangeably referred to as a 'second resonant circuit') at divided down signal from the divide down element 470 may send resonant current to the marker device antenna 410 (L1). Marker device 400 may thereby transmit output signal 414 at a lower frequency where output frequency 414 is a product of dividing down the excitation signal 412 by integer n. For example, integer n may be a predefined value, such as 128, to generate output signal 414 where output signal 414 is equal to excitation frequency divided by n. Where n is predefined as 128 and the input signal is at, for example, 13,560,000 Hz, the output signal would then be 105,937.5 Hz. Other frequencies and divide ratios may be used in various embodiments.

It is to be understood that the power circuit 450, the output circuit 480, and the divide down circuit 470 disclosed herein corresponds to the power circuit 352, the output circuit 354, and the divide down circuit 355, of FIG. 3D, respectively.

In other marker device embodiments in accordance with aspects of the present disclosure, processing elements, non-transitory memories, and/or other components for carrying out instructions may be included in the electronic circuit. For instance, such components may be used to communicate information (e.g., position information, utility type, serial number, or other information) from marker devices through signal modulation techniques (e.g., ASK, PSK, FSK, or the like). Examples of such circuitry are described in incorporated U.S. patent application Ser. No. 14/516,558, filed Oct. 16, 2014, entitled ELECTRONIC MARKER DEVICES AND SYSTEMS. In some embodiments, signal modulation may be selectively enabled or disabled in the circuitry based on the signal strength. For example, when the signal strength is below a predefined value, signal modulation in the circuitry may remain turned off After signal strength reaches a predefined value, signal modulation functionality may be triggered automatically, thereby allowing signal modulation to occur.

Tuning of a marker device embodiment with transceiver circuitry such as is described with respect to FIG. 4 may be implemented using a method embodiment such as embodiment 500 of FIG. 5. Method 500 may include a step 510 in which the desired excitation frequency is determined. For instance, the desired excitation frequency may be 13,560,000 Hz. In step 520, the offset resolution of small value capacitors is determined. For example, the small value capacitors, such as the small value capacitors 440 as described in FIG. 4, may ha be chosen to control the tuned/resonant frequency by approximately 10,000 Hz each. In step 530, an offset excitation tuning frequency is determined based on excitation frequency of step 510 and the small value capacitor values of step 520 (e.g., desired excitation frequency minus small value capacitor value).

For example, given the desired excitation frequency of 13,560,000 Hz and small value capacitors whose value influence the tuned frequency by approximately 10,000 Hz, the offset excitation tuning frequency selected at step 520 will be 13,550,000. In step 540, small value capacitors (e.g., small value capacitor 440 of FIG. 4) may be removed one at a time until the LED dims, thereby indicating that the marker device is now properly tuned. Once tuned, the marker device may be placed for use.

In accordance with certain aspects of the present disclosure, an alternate loop antenna marker device embodiment may include multiple turns of antenna coils. For example, maker device embodiment 600 illustrated in FIG. 6A may share elements of marker device 300 illustrated in FIGS.

3A-3C with the exception of having multiple coil turns 610 and 620. Marked device embodiment 630 illustrated in FIGS. 6B and 6C likewise has multiple turns of antenna element 650, as shown in FIG. 6C. Each coil turn 610 and 620 (of FIG. 6A) or the multiple turns of antenna element 650 may be turns of the same conductive antenna element insulated with an insulating jacket or, in alternate configurations, may include multiple housings or other configurations.

For example, the marker device embodiment 630, as shown in partial detail in FIG. 6C, may include an insulating jacket or cover 640 enclosing the multiple turns of the marker device antenna 650. The jacket 640 may be used to insulate the marker device antenna from the underground environment and seal the antenna element from the ingress of water or other fluids as described elsewhere herein. The jacket 640 may also provide a protective covering to reduce physical damage to the marker device antenna 650 due to impact of surrounding objects and/or environment under the ground.

The jacket 640 may operate as a dielectric material between the marker device antenna 650 and the ground, and may prevent detuning of the marker device antenna 650. For example, the insulating jacket 640 may be made of polypropylene or other materials having a similar dielectric constant as of polypropylene (e.g., polyethylene having about 2.25 dielectric constant, polystyrene having about 2.4-2.7 dielectric constant, polytetrafluoroethylene having about 2.25 dielectric constant, etc.) to provide a predefined capacitance between the marker device antenna 650 and the ground. Other housing embodiments as described elsewhere herein may also be used.

Figure 6A:
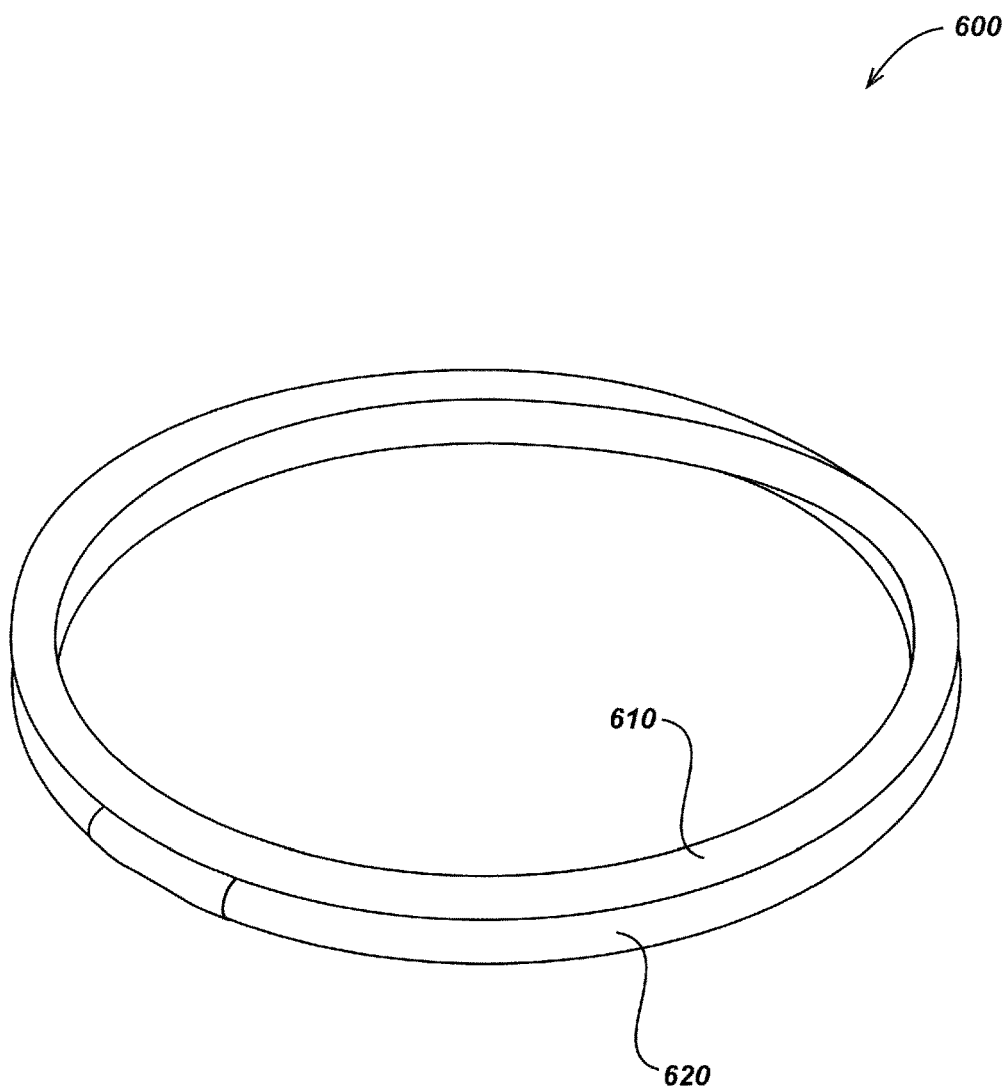
FIG. 6A is an isometric view of a multi-loop style marker device embodiment.
Figure 6B:
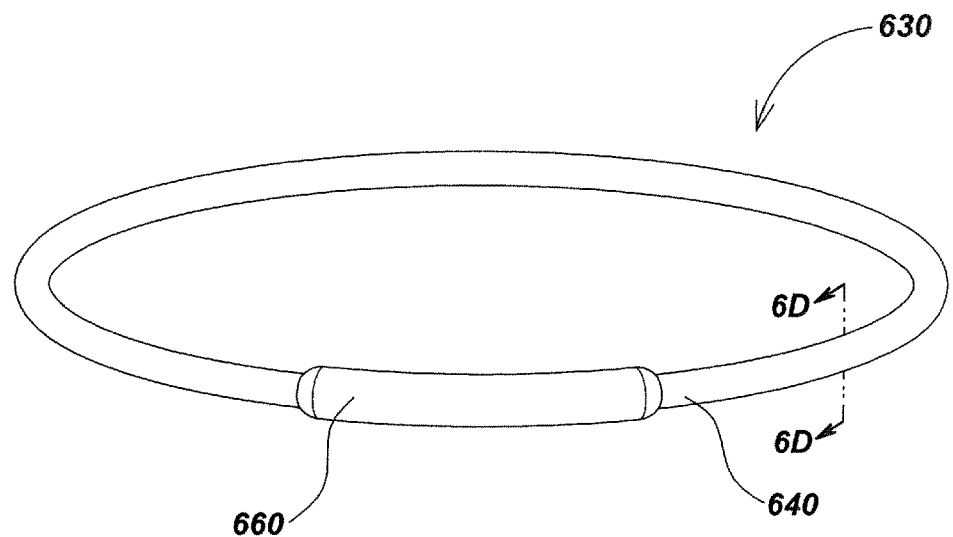
FIG. 6B is an isometric view of another multi-loop style marker device embodiment.
Figure 6C:
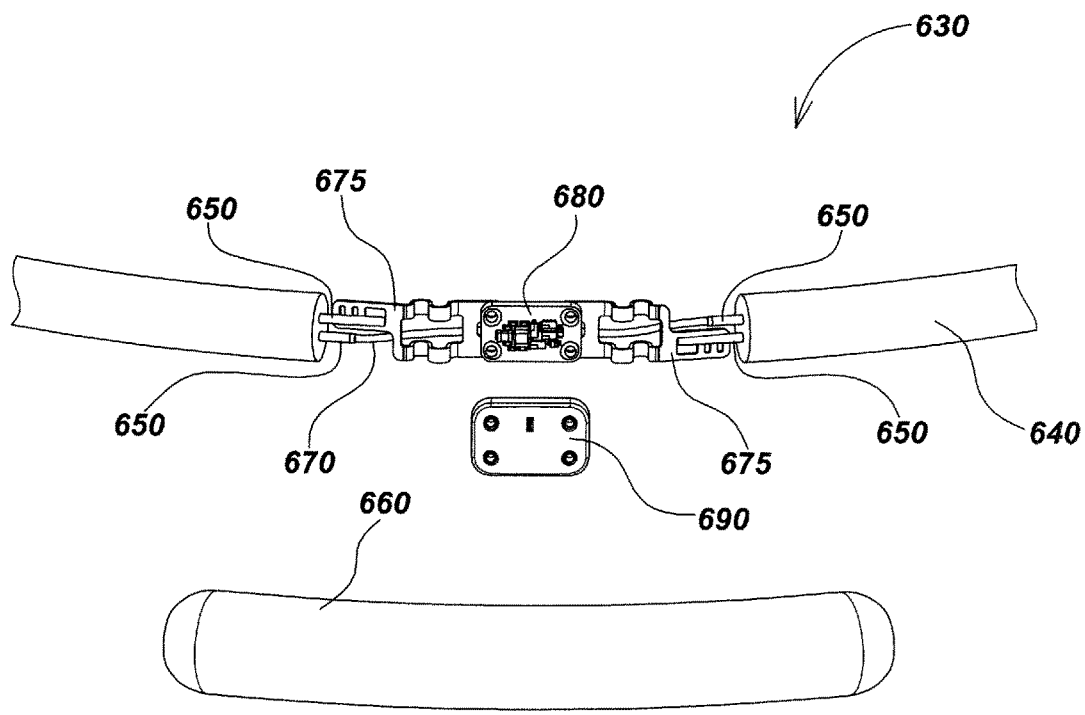
FIG. 6C is a partially exploded partial view of the marker device embodiment of FIG. 6B.
Figure 6D:
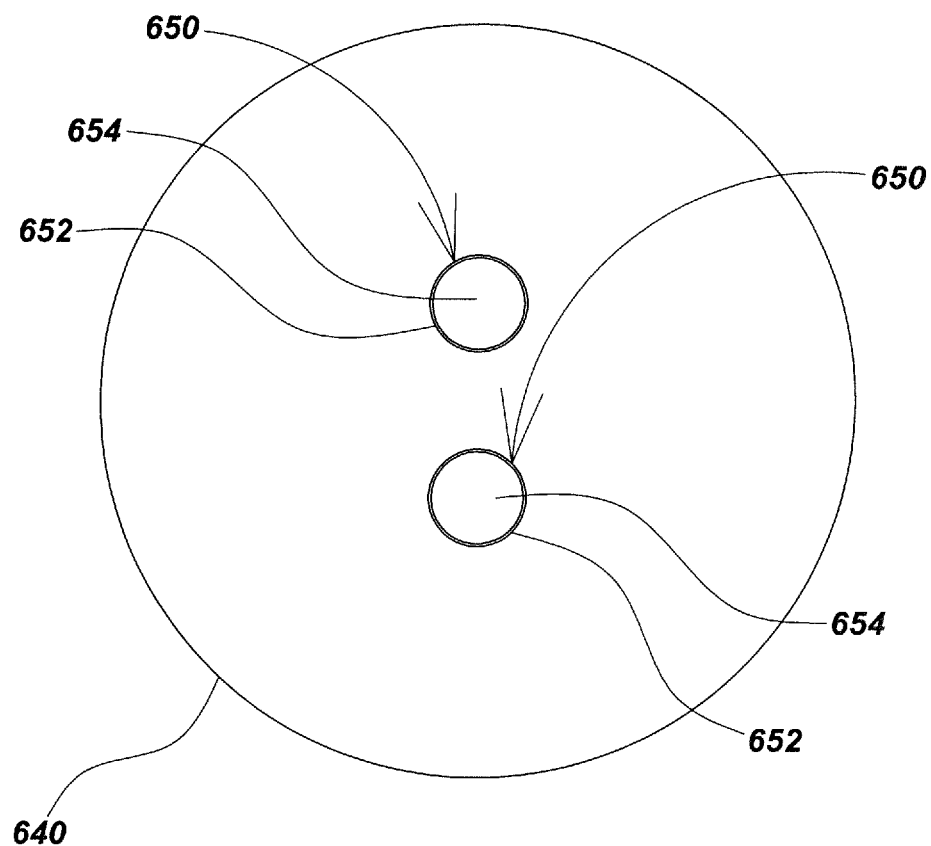
FIG. 6D is a section view along line 6D-6D from the embodiment of FIG. 6B.

The marker device antenna 650 may be comprised of copper-clad steel, as illustrated in FIG. 6D, having an outer conductor 652 surrounding a structural core of steel 654. Other conductor/structural embodiments as described herein may also be used. The insulating jacket 640 encapsulating the marker device antenna may have a predetermined thickness, given the dielectric constant of jacket materials, to reduce capacitive coupling of signals to conductive soil or other surrounding environment and further detuning of the marker device 630 (FIGS. 6B and 6C) to a desired amount.

Referring back to FIG. 6C, a cover element 660 encapsulating internal electronics, in combination with the insulating jacket 640, may be included to protect against corrosive or other damaging elements of the soil or other environments in which marker device 630 is placed. In an exemplary embodiment, the dielectric material jacketing the marker device antenna may be of a thickness of approximately twice the diameter of the antenna conductor or larger. In marker device 630, the insulating jacket 640 may be of ⅜ to ½ inch polypropylene encapsulating the multiple turns of the marker device antenna 650 of 10 to 16 gauge copper-clad steel.

As further illustrated in FIG. 6C, the cover element 660 may encapsulate an antenna connector 670 providing an electrical pathway between the end of one turn of the marker device antenna 650 and the opposite end of the other turn of the marker device antenna 650 as well as a series of terminal connector pieces 675 connecting and providing electric pathways between the unconnected ends of each turn of the marker device antenna 650 and a PCB 680. The PCB 680 may include the transceiver circuitry processing of received excitation signals, powering, and generating output signals to the marker device antenna 650. The transceiver circuitry may correspond to that described with respect to FIG. 4 or other marker devices disclosed in incorporated U.S. patent application Ser. No. 14/516,558, filed Oct. 16, 2014, entitled ELECTRONIC MARKER DEVICES AND SYSTEMS or as known or developed in the art. A PCB cover 690 may cover PCB 680 to protect circuitry therein during the manufacturing process and further aid in protecting the PCB 680 circuitry from corrosive or damaging external elements when in use.

The loop antenna marker device embodiments disclosed herein, such as marker device 300 of FIGS. 3A-3C and marker device 600 of FIG. 6A and marker device 630 of FIGS. 6B and 6C, may be placed on or near utility lines or other buried assets. In some embodiments, such marker devices may be physically connected together along one or more lengths of rope, tape, cordage, or other associated materials and placed on or near the target utility. In some embodiments the marker devices may be attached or coupled to the utility, such as being embedded in a pipe or tubular utility, or attached to a tape or other material buried adjacent to the utility.

Figure 7:
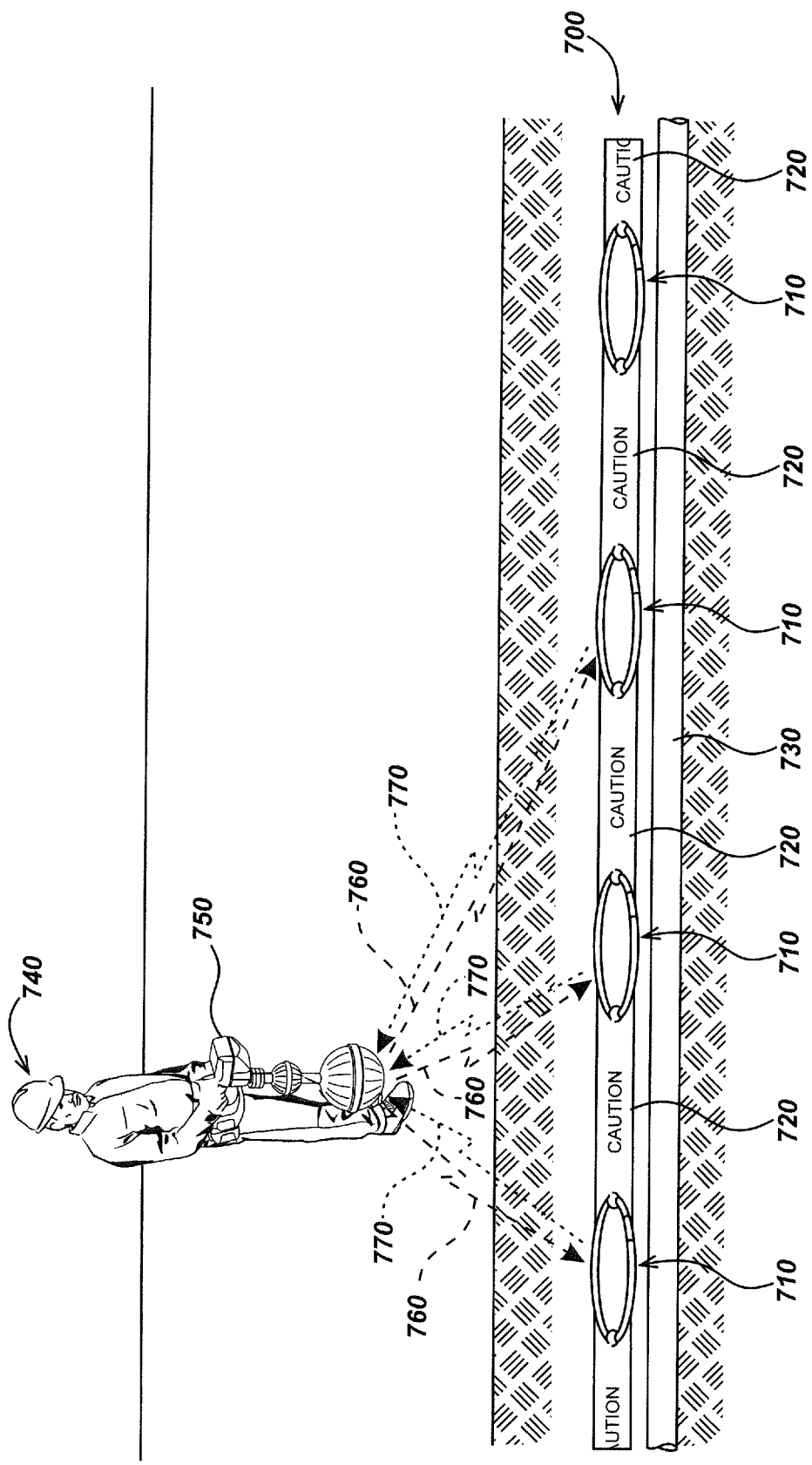
FIG. 7 illustrates a locate system with a marker tape embodiment.

For example, as illustrated in FIG. 7, a marker tape embodiment 700 may include a plurality of such loop antenna marker devices 710 secured to and spaced apart along a tape-shaped structure or housing 720. The marker device 710 may be of the variety of marker devices 300 of FIGS. 3A and 3B. Tape 720, containing multiple loop antenna marker devices 710, may be rolled out on or near the length of a utility 730 or other buried asset. In such device embodiments and systems thereof, a user 740 equipped with an integrated buried utility locator 750, in which the excitation device antenna and associated circuitry may be contained or integrated in the utility locator or may be separate in some embodiments, may send an excitation signal 760, which may be received at one or more of the marker devices 710 on marker tape 700. Receiving of excitation signal 760 at marker devices 710 may power the marker device 710 and generate and transmit a corresponding marker device output signal 770 which may be received back at the locator and processed as described herein to locate the marker device(s).

In some embodiments, as a user traverses the length of the a marker tape (such as marker tape 700 of FIG. 7) or other series of marking device embodiments creating a pathway, only the individual marker device (e.g., marker device 710 of FIG. 7) nearest the excitation signal may become energized and transmit a signal, thereby allowing the user to trace from one individual marking device to the next based on proximity to the excitation signal. In some embodiments, the marker devices may be programmed and sized for a particular application so that only a single marker device will be turned upon when excited by a particular excitation circuit (e.g., by limiting output power, etc., and/or by data received from the excitation device or by other methods).

Figure 8A:
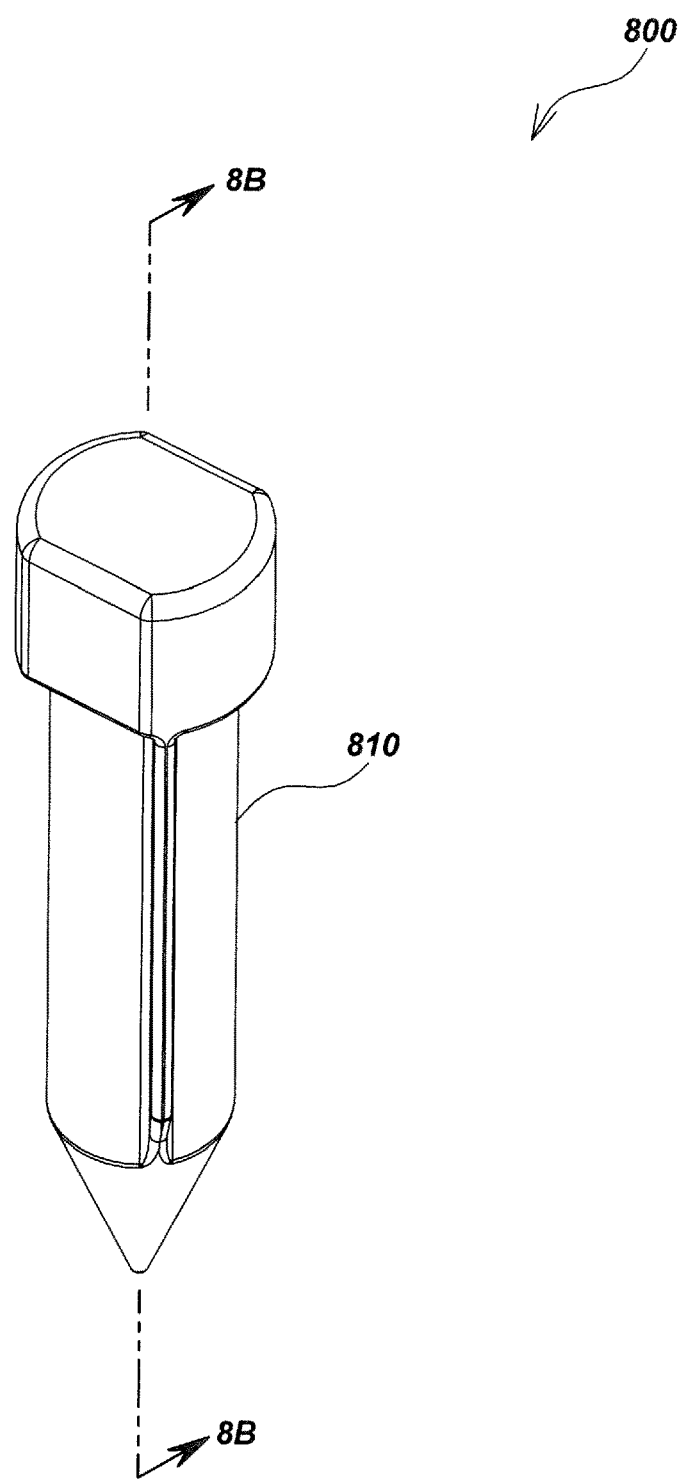
FIG. 8A is an isometric view of a ground-stake marker device embodiment.
Figure 8B:
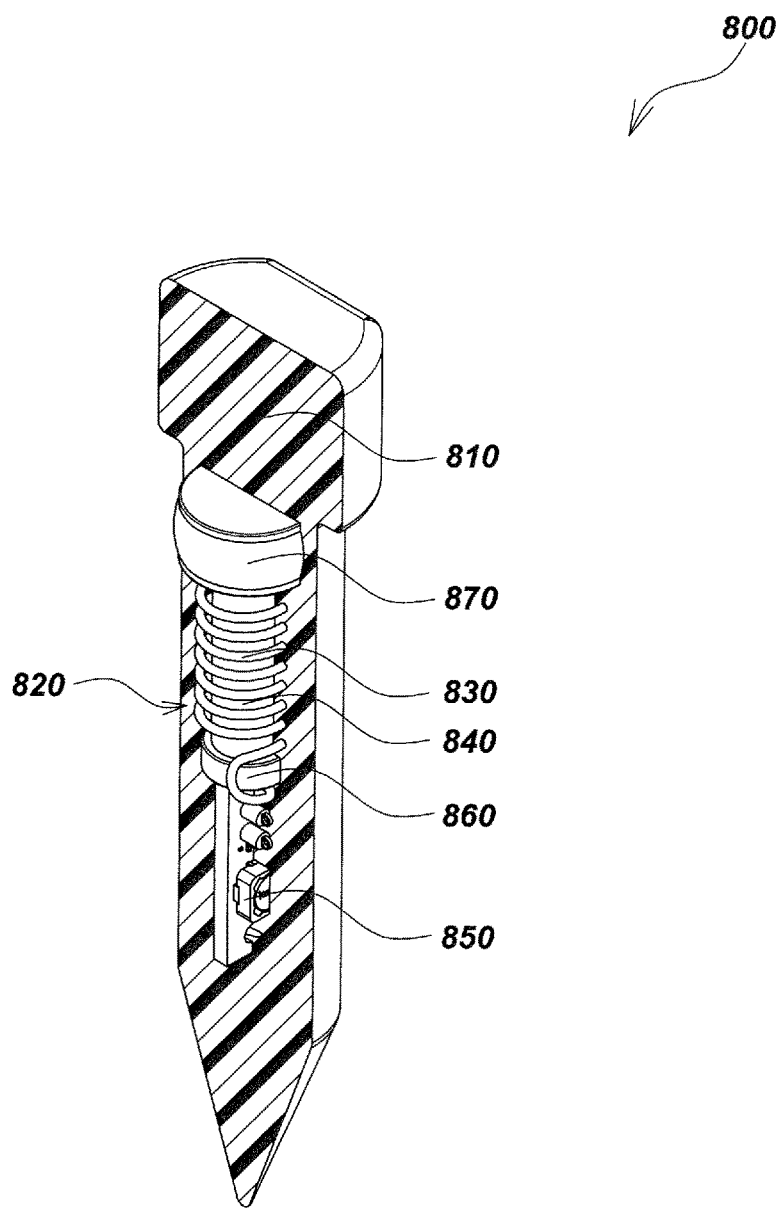
FIG. 8B is a partially cut away view of the ground-stake marker device embodiment of FIG. 8A.

Turning to FIGS. 8A and 8B, ground-stake marker device embodiment 800 in keeping with the present disclosure is illustrated. Marker device 800 may include an insulating jacket 810 encapsulating, as shown in FIG. 8B, a marker device antenna, which is a loopstick antenna 820 in this embodiment. Marker device 800 may include a PCB 850 with electronics, a PCB connector 860, and a dampening piece 870. The electronics may include marker device circuitry as described elsewhere herein and in the incorporated applications. The ground stake marker device housing may be shaped in the form of a stake as shown in FIG. 8A with a spike end, a head end for pushing or pounding, and an elongate middle therebetween.

The insulating jacket 810 may be comprised of materials having a low dielectric constant such as described previously herein. For example, such low dielectric constant materials may include polypropylene (2.2-2.36), polyethylene (2.25), polystyrene (2.4-2.7), polytetrafluoroethylene (2.25), or other materials having a similarly low dielectric constant number. The insulating jacket 810 of ground-stake marker device 800 may be shaped with a point about one end to facilitate ease in being forced or otherwise placed in the ground as further illustrated in FIG. 9 and in a generally stake-shaped housing structure. In alternative embodiments, other shapes of insulating jackets may be used to aid in marker device placement.

As illustrated in FIG. 8B, the loopstick antenna 820 of ground-stake marker device 800 may include a plurality of conductive windings 830 (e.g., conductive wire, tape, PCBs, and the like) wrapped or placed about a ferrite rod 840. A PCB 850 containing transceiver circuitry may connect electrically to conductive windings 830 for processing received excitation signals, powering, and generating output signals to the conductive windings 830 of the loopstick antenna 820. Such transceiver circuitry may be of the type as described in FIG. 4 herein or that of the various marker devices disclosed in incorporated U.S. patent application Ser. No. 14/516,558, filed Oct. 16, 2014, entitled ELECTRONIC MARKER DEVICES AND SYSTEMS, or of other similar electronic circuits as known or developed in the art. A PCB connector 860 may be used to secure PCB 850 to ferrite rod 840. An optional dampening element 870 may be positioned about the top of loopstick antenna 820 so as to protect internal components from possible damage inflicted when ground-stake marker device 800 is hammered or otherwise forced into the ground.

Turning to FIG. 9, one or more ground-stake marker devices 800 may be pushed or hammered into the ground surface 910 above or near a buried utility 920 or other buried asset. In such locating systems, a user 940 equipped with an integrated buried utility locator 950 may send excitation signal 960 received at one or more of the marker devices 800. Receiving of excitation signal 960 at marker device 800 may power marker device 800 and generate and transmit output signal 970.

Turning to FIG. 10, a stake placement device embodiment 1000 may be used to place ground-stake marker device 800 into the ground 1010 generally above a buried utility line 1020 or other buried asset. As illustrated, stake placement device 1000 may be held by a user 1040 with a ground-stake marker device 800 secured in its distal end as the user 1040 provides a downward force to push the ground-stake marker device 800 into the ground 1010.

Figure 11A:
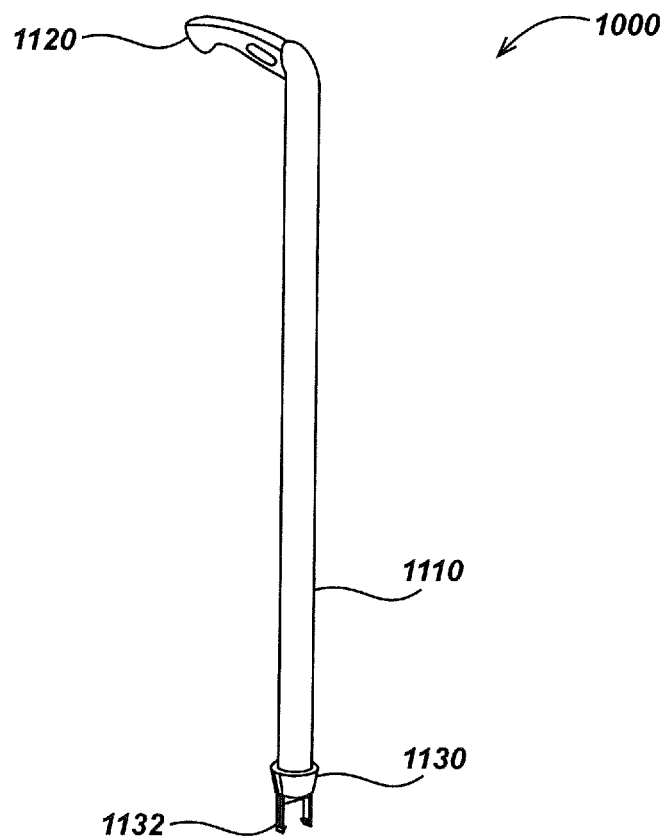
FIG. 11A is an isometric view of the stake placement device embodiment of FIG. 10.

As illustrated in FIG. 11A, the stake placement device 1000 may include a vertical shaft 1110 with a handle 1120 formed on one end. On the end opposite the handle 1120, a stake holding structure 1130 may be formed with a pair of arms 1132.

Figure 11B:
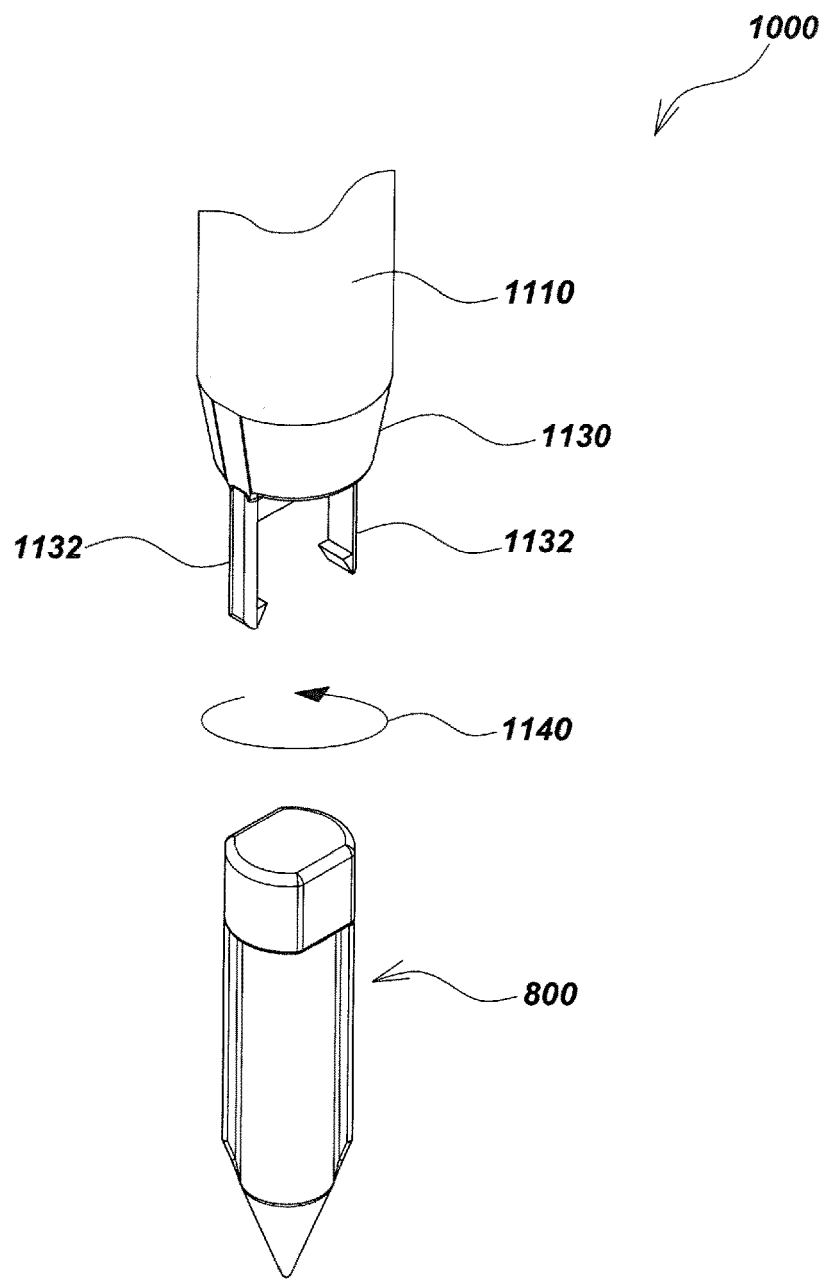
FIG. 11B is an isometric view of the ground-stake marker device embodiment of FIG. 8A and lower portion of stake placement device embodiment of FIG. 10 illustrating release of the ground-stake marker device.

Turning to FIG. 11B, the arms 1132 may be shaped to grip a top portion of ground-stake marker device 800. Upon pressing the ground-stake marker device 800 in the ground (not shown), a rotation of stake placement device 1000 in direction 1140 may allow the ground-stake marker device 800 to be freed from the stake placement device 1000 and left in the ground.

Figure 12A:
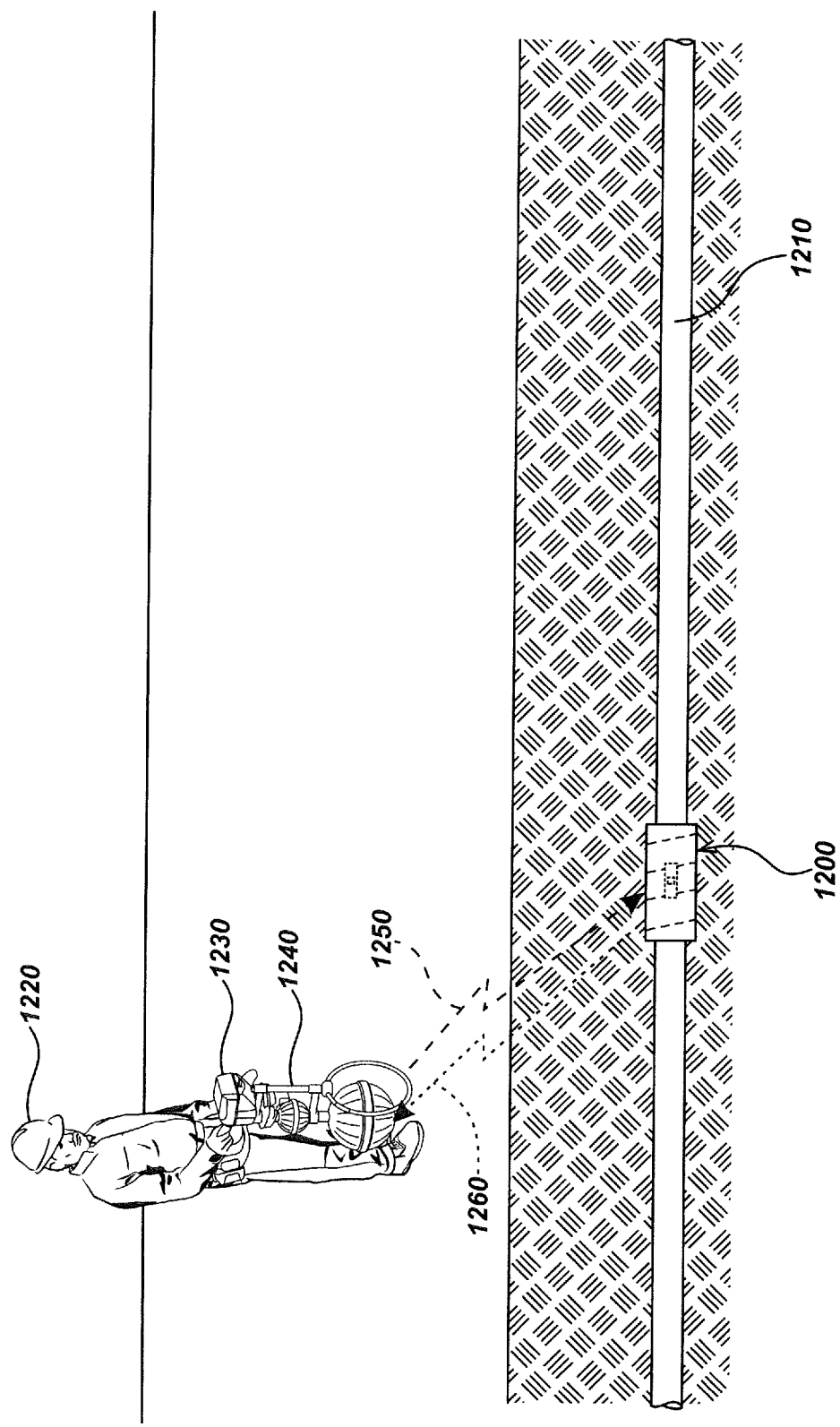
FIG. 12A illustrates a locate system using a pipe sleeve marker device embodiment.

Turning to FIG. 12A, a locating system embodiment a with a pipe sleeve marker device embodiment 1200 is illustrated. The pipe sleeve marker device embodiment 1200 may be fitted about a utility line 1210, such as at connections between pipe segment. In various embodiments, the marker device housing may be shaped to conform to a particular outer shape and size of a corresponding pipe or other object. In some embodiments, such a pipe sleeve marker device 1200 may be used as a fitting in securing together separate sections of a utility line. In alternate embodiments, the pipe sleeve marker device may include ends and internal dimensions shaped to fit over a pipe or other tubular element or other object.

In the locating system embodiment of FIG. 12A, a user 1220 is equipped with a buried utility locator 1230. An accessory marker excitation device 1240, which may correspond to the accessory marker excitation device 250 of FIG. 2B, may be fitted to locator 1230 for producing excitation signal 1250. The pipe sleeve marker device 1200 may receive the excitation signal 1250, be powered and transmit a corresponding output signal 1260. The long axis orientation and depth of the pipe or utility line (e.g. utility line 1210) may be determined by the magnetic field signal emitted from the pipe sleeve marker device 1200.

Figure 12B:
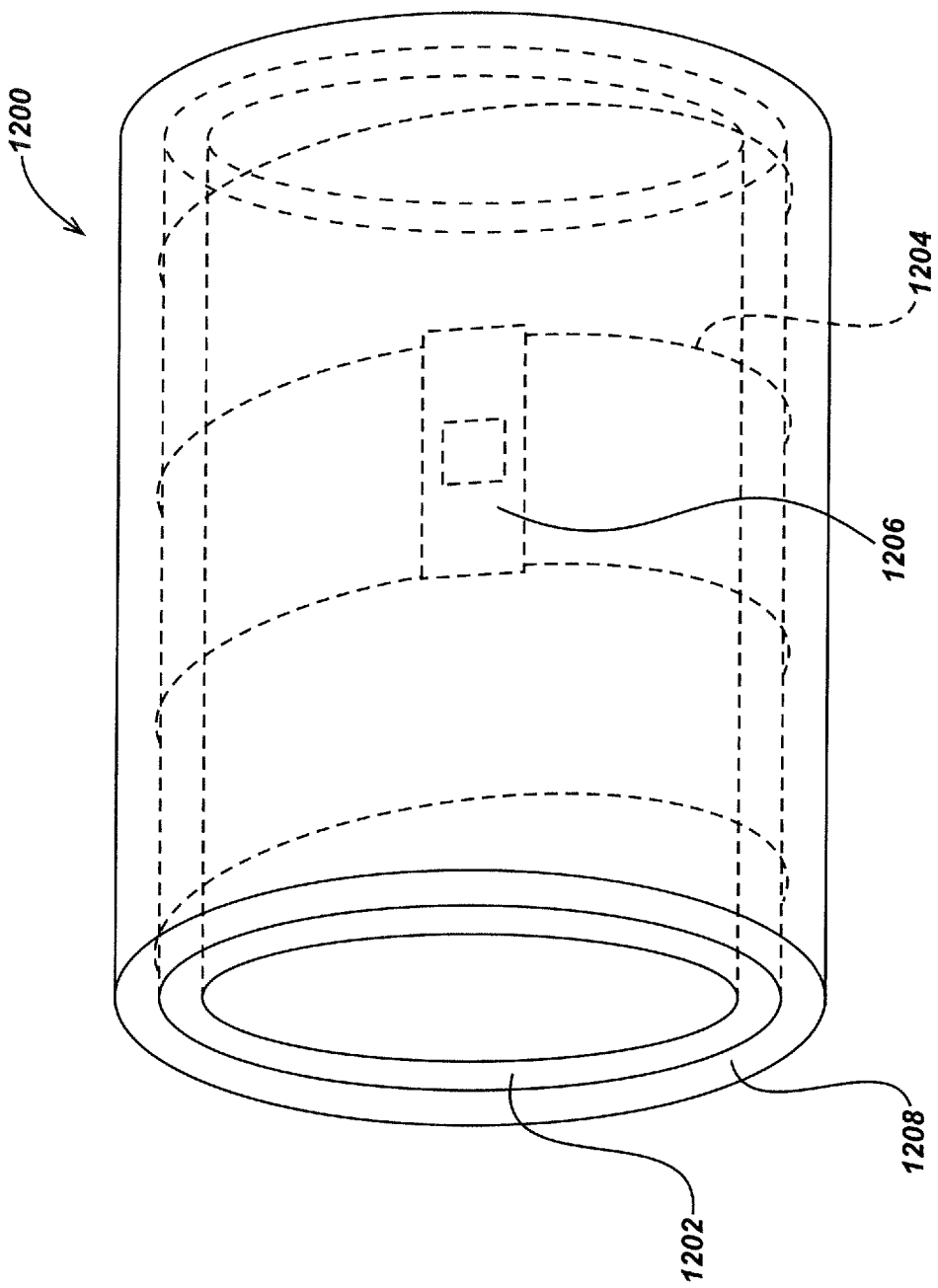
FIG. 12B is a detailed illustration of the pipe sleeve marker device embodiment of FIG. 12A.
Figure 12C:
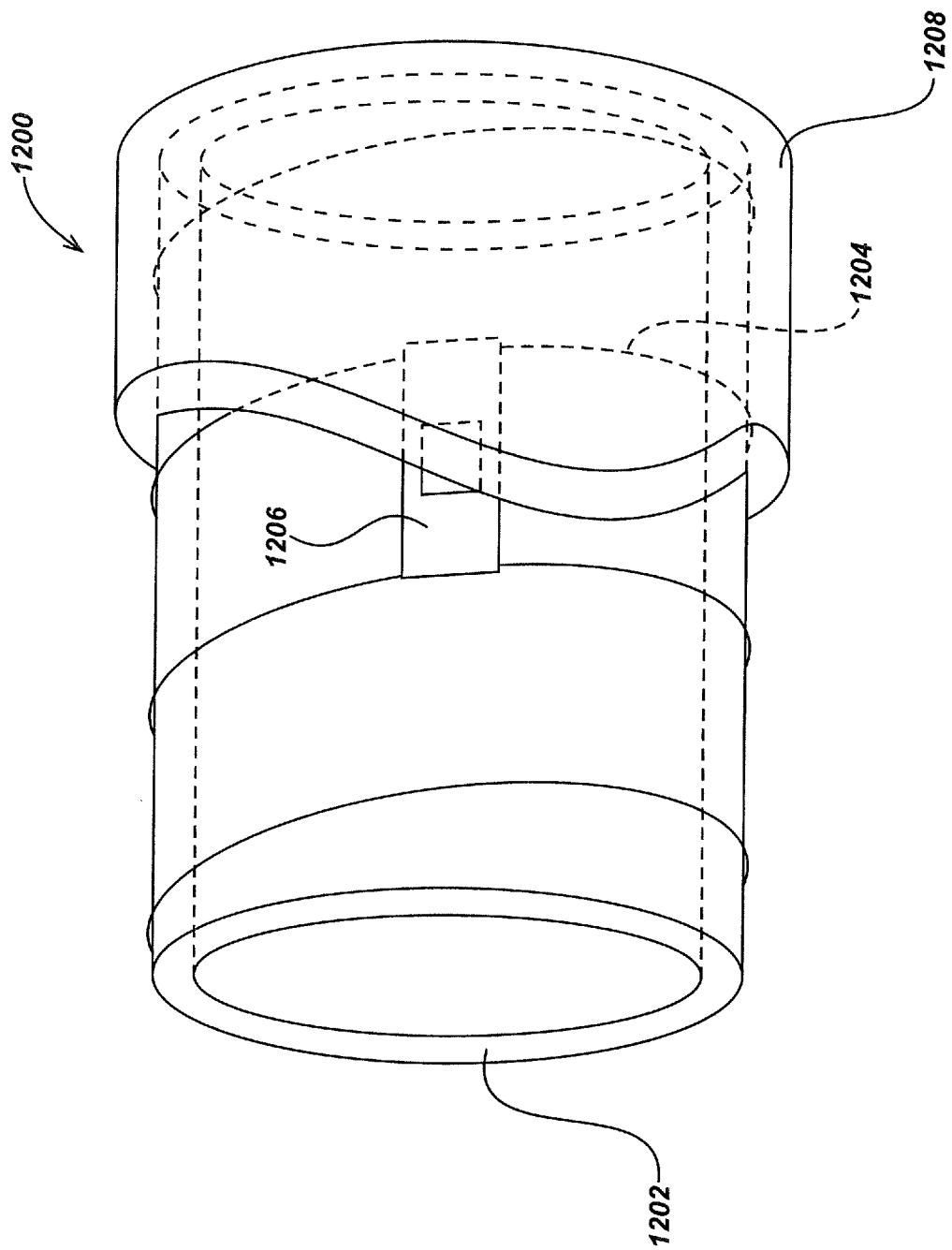
FIG. 12C is a detailed cutaway illustration of the pipe sleeve marker device embodiment of FIG. 12A.
Figure 12D:
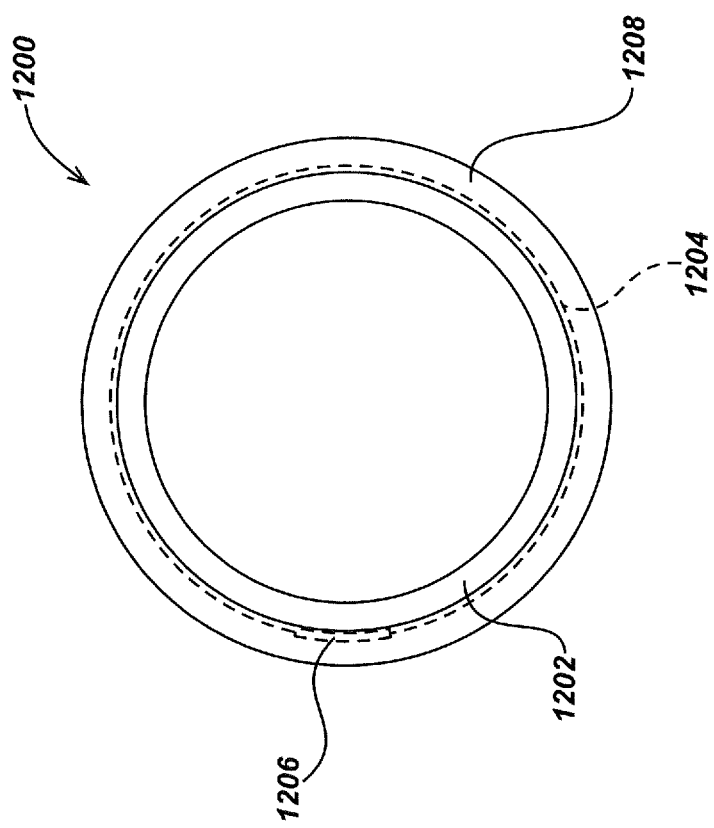
FIG. 12D is an illustration of the pipe sleeve marker device embodiment of FIG. 12A looking down the length of the pipe sleeve marker device.

As illustrated in FIGS. 12B, 12C, and 12D, the pipe sleeve marker device embodiment 1200 may have an interior sleeve 1202 onto which one or more turns of conductive windings 1204 may be wound. A PCB 1206 containing transceiver circuitry may connect electrically to conductive windings 1204. The transceiver circuitry may correspond to that described with respect to FIG. 4 or other marker devices disclosed in incorporated U.S. patent application Ser. No. 14/516,558, filed Oct. 16, 2014, entitled ELECTRONIC MARKER DEVICES AND SYSTEMS, or as known or developed in the art.

An outer sleeve 1208 may be extruded or otherwise fixed about the interior sleeve 1202 with conductive windings 1204 and PCB in between. The interior sleeve 1202 and outer sleeve 1208 may be comprised of materials having a low dielectric constant, such as described previously herein. For instance, such low dielectric constant materials may include polypropylene (2.2-2.36), polyethylene (2.25), polystyrene (2.4-2.7), polytetrafluoroethylene (2.25), or other materials having a similarly low dielectric constant number. A pipe sleeve marker device embodiment in accordance with aspects of the present disclosure may also use or be comprised of polyvinyl chloride (PVC), acrylonitrile butadiene styrene (ABS), and/or other non-conductive pipe materials. Some embodiments may use materials with a higher dielectric constant. The thickness of interior sleeve 1202 and outer sleeve 1208 may be dimensioned to reduce capacitive coupling of signals to either conductive elements in the surrounding environment as well as the environment within the pipe or utility line. For instance, the thickness of the interior sleeve 1202 need not be as thick in the pipe sleeve marker device 1200 where the utility line is used for natural gas versus a utility line used for water, due to the low conductivity of materials flowing within the pipe.

Figure 13A:
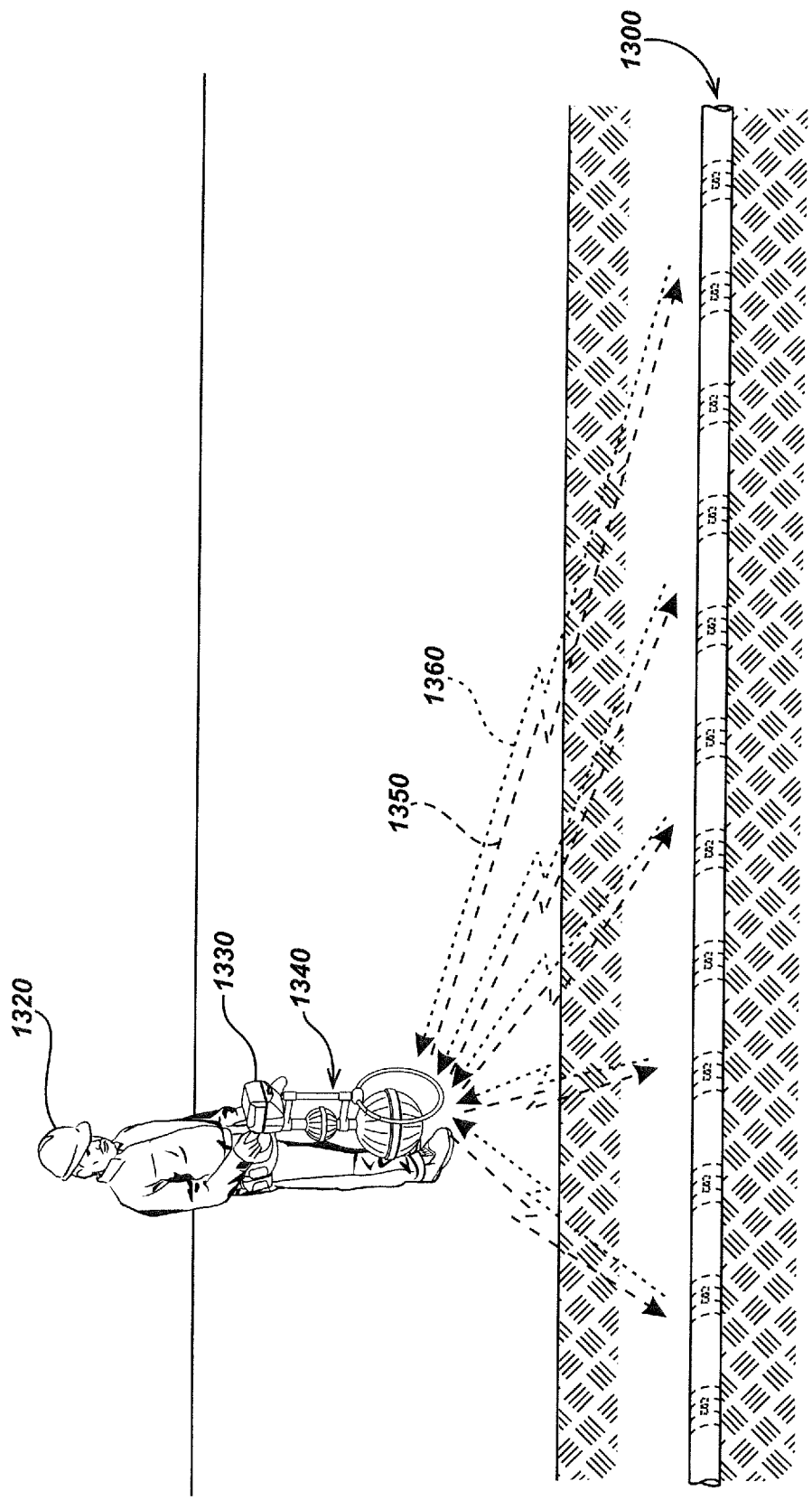
FIG. 13A is an illustration of a locate system using a marker device embedded pipe embodiment.

Turning to FIG. 13A, a marker device embedded pipe or utility 1300 including marker device electronic circuits and marker device antennas embedded in the pipe or utility is illustrated. In the locating system embodiment illustrated in FIG. 13A, a user 1320 is equipped with a buried utility locator 1330. An accessory marker excitation device 1340, which may correspond to the accessory marker excitation device 250 of FIG. 2B or other embodiments described herein or known or developed in the art, for producing excitation signal 1350, may be fitted to locator 1330. The marker device embedded pipe 1300 may receive the excitation signal 1350 at one or more points, be powered, and transmit corresponding output signals 1360.

Figure 13B:
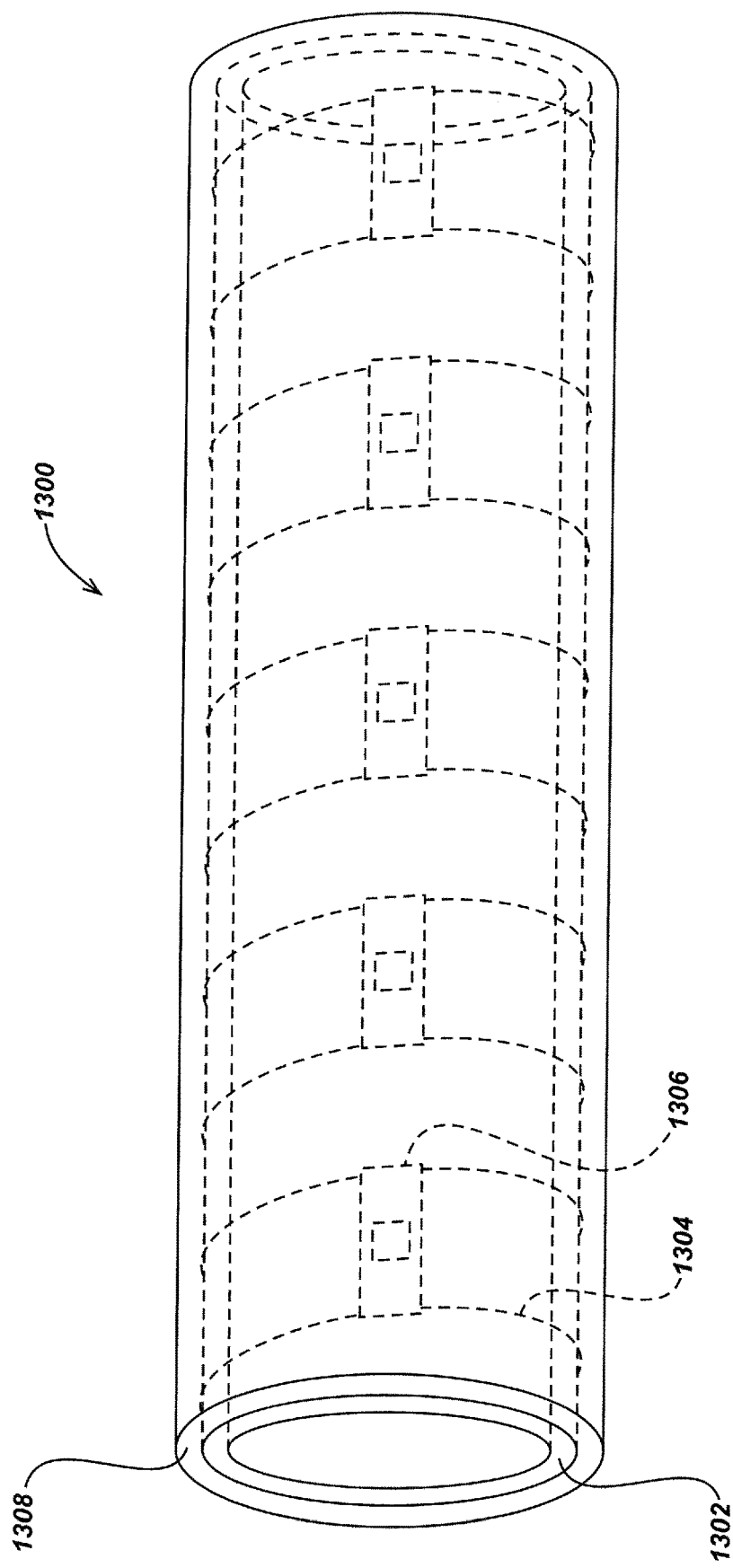
FIG. 13B is a detailed illustration of the marker device embedded pipe embodiment of FIG. 13A.
Figure 13C:
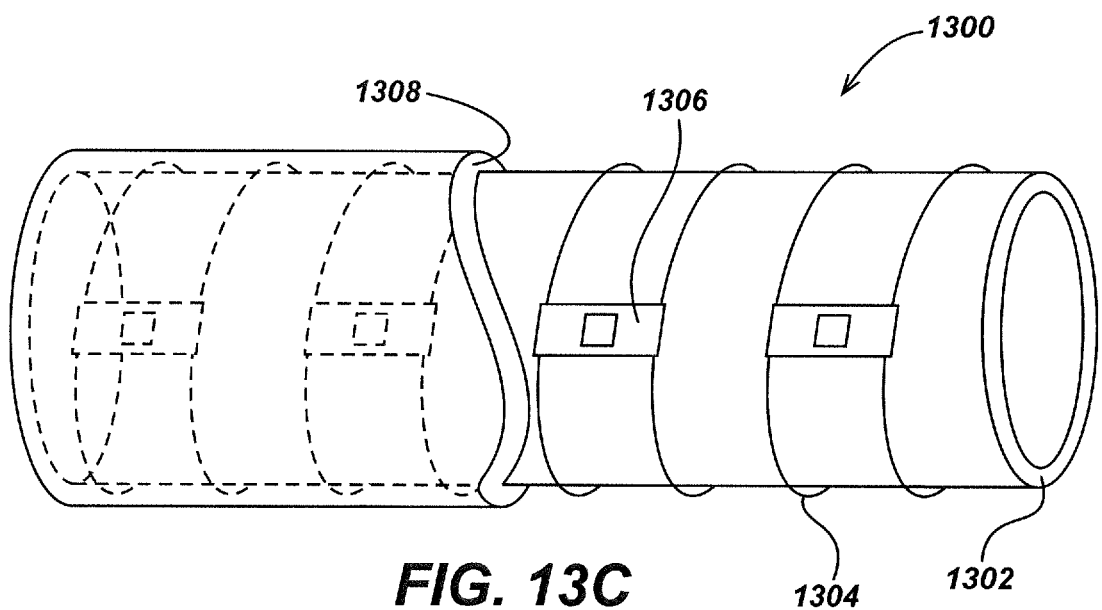
FIG. 13C is a detailed cutaway illustration of the marker device embedded pipe embodiment of FIG. 13A.
Figure 13D:
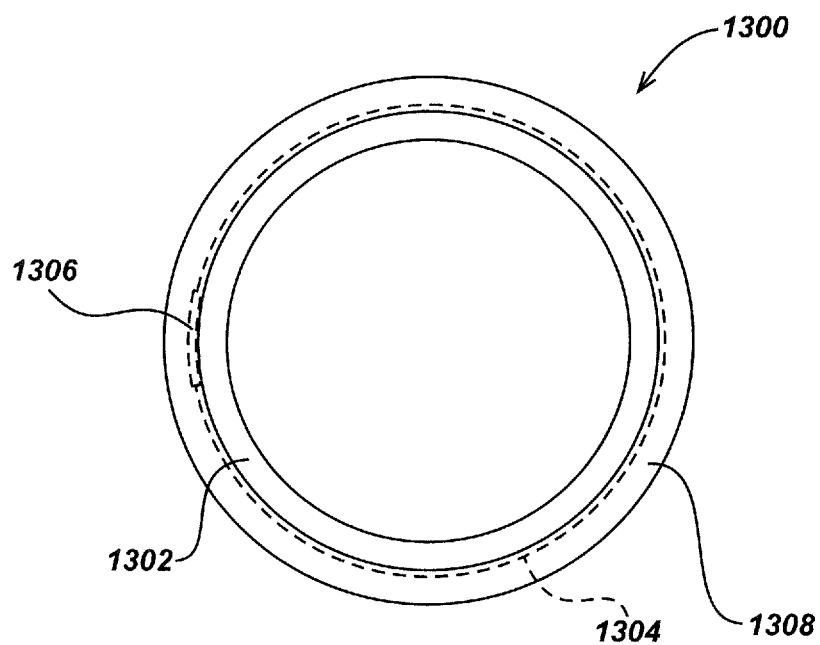
FIG. 13D is an illustration of the marker device embedded pipe embodiment of FIG. 13A looking down the length of the marker device embedded pipe embodiment.

As illustrated in FIGS. 13B, 13C, and 13D, the marker device embedded pipe embodiment 1300 may have an interior pipe length 1302 onto which a plurality of turns of conductive windings 1304 may be wound. A PCB 1306 containing transceiver circuitry may connect electrically to conductive windings 1304. The transceiver circuitry may be of the type described with respect to FIG. 4 or other marker devices disclosed in incorporated U.S. patent application Ser. No. 14/516,558, filed Oct. 16, 2014, entitled ELECTRONIC MARKER DEVICES AND SYSTEMS or other electronic circuits as known or developed in the art. An outer pipe length 1308 may be extruded or otherwise fixed about the interior pipe length 1302 with conductive windings 1304 and PCB 1306 secured in between.

In an exemplary embodiment, the interior pipe length 1302 and outer pipe length 1308 may comprise materials having a low dielectric constant. For instance, such materials may include polypropylene (2.2-2.36), polyethylene (2.25), polystyrene (2.4-2.7), polytetrafluoroethylene (2.25), or other materials having a similarly low dielectric constant number. Marker device embedded pipe embodiments in accordance with aspects of the present disclosure may also use or be comprised of polyvinyl chloride (PVC), acrylonitrile butadiene styrene (ABS), and/or other non-conductive pipe materials. Some embodiments may use materials having a higher dielectric constant.

The thickness of interior pipe length 1302 and outer pipe length 1308 may be dimensioned to reduce capacitive coupling of signals to either conductive elements in the surrounding environment as well as the environment within marker device embedded pipe 1300. For example, the thickness of the interior pipe length 1302 need not be as thick in the marker device embedded pipe 1300 for natural gas pipes as for water or other liquid pipes.

In some embedded pipe and pipe sleeve embodiments, the wire may not be continuous or operatively coupled throughout the entire embodiment. Instead, embedded pipe and pipe sleeve embodiments may contain separate circuits having one or more turns of antenna, and each with its own connected transceiver circuitry which may be included on a PCB, flex circuit, and the like. For example, as illustrated in FIG. 14A, an embedded pipe marker device embodiment 1400 may have multiple individual, non-connected marker device circuits. Embedded pipe marker device 1400 may have an interior pipe length 1402 onto which individual, non-connected turns of conductive windings 1404 are wound. Each individual, non-connected turn of conductive winding 1404 may further be electrically connected to a separate PCB 1406 containing transceiver circuitry as described with respect to FIG. 4 and incorporated U.S. patent application Ser. No. 14/516,558, filed Oct. 16, 2014, entitled ELECTRONIC MARKER DEVICES AND SYSTEMS, or as known or developed in the art.

An exterior pipe length 1408 may be extruded or otherwise fixed to outside of the interior pipe length 1402, securing conductive windings 1404 and PCB 1406 in between. In some embodiments, an embedded pipe may have multiple marking device distinct circuits where multiple turns of conductive windings may be in each circuit.

In other embedded pipe and pipe sleeve embodiments, different orientations, shapes, and/or placement locations of marker device antennas may be used. For example, as illustrated in FIG. 14B, such an embedded pipe marker device 1450 may have a number of differently oriented marker device antennas 1454, each electrically connected to PCB 1456 containing transceiver circuitry as described with respect to FIG. 4 and incorporated U.S. patent application Ser. No. 14/516,558, filed Oct. 16, 2014, entitled ELECTRONIC MARKER DEVICES AND SYSTEMS, or other transceivers or other electronic circuits as known or developed in the art. The marker device antennas 1454 may be rectangular, running on different sides of embedded pipe marker device 1450 between an interior pipe length 1452 and an exterior pipe length 1458.

Figure 15:
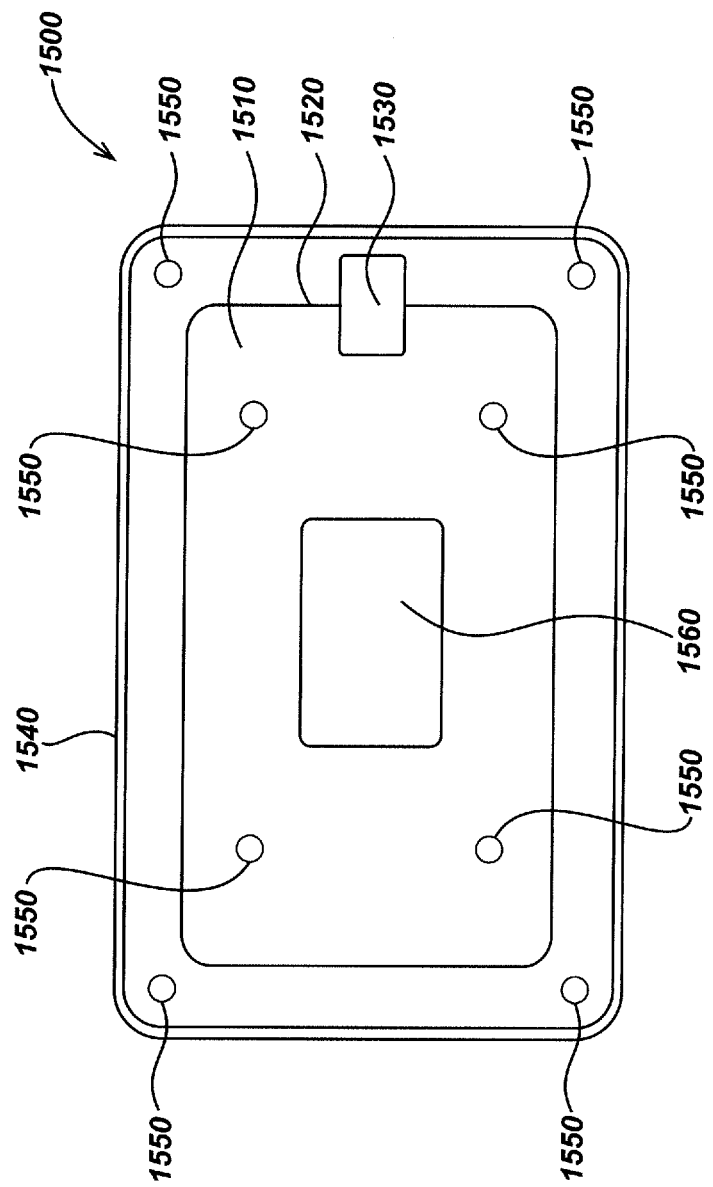
FIG. 15 is an illustration of a PCB marker device embodiment.

Turning to FIG. 15, a PCB marker device embodiment 1500 is illustrated. Marker 1500 may include a PCB 1510 on which various marker device components (e.g., marker device antenna, electronic circuit, and the like) are included/ mounted. For example, PCB 1510 of PCB marker device 1500 may include a marker device antenna 1520 and an electronic circuit 1530 secured thereto. The marker device antenna 1520 may be one or more traces on PCB 1510 and/or comprise wire or other conductive element secured thereto. The electronic circuit 1530 may be of the variety described in conjunction with FIG. 4 and/or that in the incorporated U.S. patent application Ser. No. 14/516,558, filed Oct. 16, 2014, entitled ELECTRONIC MARKER DEVICES AND SYSTEMS or other electronic circuits as known or developed in the art.

An overmold layer 1540 may enclose or encapsulate PCB 1510, marker device antenna 1520, the electronic circuit 1530, and other components therein. The overmold layer 1540 may at a predetermined thickness sufficient (e.g., twice the diameter of antenna core or larger) to provide a physical distance between the marker device antenna 1520/electronic circuit 1530 and the soil or other environment in which PCB marker device 1500 is buried or placed, such as to provide physical and/or dielectric isolation. The overmold layer 1540 illustrated in FIG. 15 may be comprised of translucent or transparent materials. In other embodiments, the overmold layer 1540 may comprise a variety of other materials, including opaque materials. Such overmold layer 1540 materials may, in general, be non-conductive and have a low dielectric constant, such as rubber or plastic materials, or other materials, having these properties.

The thickness of the overmold layer 1540, and the physical distance created therefrom, may be selected to reduce capacitive coupling of signals (at both loading of received excitation signal and broadcasting of output signal) with the soil or other conductive elements in the soil, and thereby reduce detuning of the PCB marker device 1500. The overmold layer 1540 may further protect internal components (e.g. PCB 1510, antenna 1520, and electronic circuit 1530) from corrosive and otherwise damaging elements in the soil or other locate environment.

A series of optional overmold holes 1550 may be formed through PCB 1510 allowing materials of the overmold layer 1540 to seep through during the overmolding process to add to the strength of the mechanical bond of the overmold layer 1540. An additional hole 1560 may optionally be formed through PCB 1510 and overmold layer 1540. In alternative embodiments, a PCB marker device embodiment may be formed in shapes other than the rectangular shape illustrated herein. For example, a PCB marker device embodiment may be round having a substantially round-shaped PCB and a circular marker device antenna. In some embodiments, the PCB 1510 may be a flex circuit or may be comprised of other flexible materials, thereby allowing the PCB marker device to bend and flex. Such embodiments may further be bonded or glued or otherwise attached to curved or contoured portions of pipes or other objects for use in locating the marker device and associated pipes or other objects.

In some configurations, the apparatus, circuit, modules, or systems described herein may include means for implementing features or providing functions described herein related to integrated locators, marker devices, marker device excitation transceivers, and related devices, components, methods, and systems. In one aspect, the aforementioned means may be a module comprising a processing element including a processor or processors, associated memory and/or other electronics in which embodiments of the invention reside, such as to implement signal reception, signal processing, switching, signal transmission, or other functions to process and/or condition transmitter outputs, locator inputs, filter received signals, and/or provide other electronic functions described herein. These may be, for example, modules or apparatus residing in buried object integrated locators, marker devices, marker device marker excitation devices or receiver devices, and/or other related equipment, devices, or systems.

In one or more exemplary embodiments, the electronic functions, methods and processes described herein and associated with buried utility marker devices, locators, transmitters, and associated elements may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the invention.

The various illustrative functions and circuits described in connection with the embodiments disclosed herein may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In various configurations, a processing element may include one or more processors and one or more operatively coupled processor-readable non-tangible memories wherein instructions to generate the methods, processes, functions, or circuits described herein are stored in the non-tangible memories and read from the memories for execution by the one or more processors. The processing elements may include additional components operatively coupled to the processor(s) such as analog to digital converters, timers, clocks, input-output circuits, communication modules, and/or other electronic devices as are known or developed in the art to receive, process, and/or send analog or digital signals.

The steps or stages of a method, process or algorithm described in connection with the marker device or locator embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the present invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein, but is to be accorded the widest scope consistent with the appended claims and their equivalents.

We claim:

1. A buried utility marker device, comprising:
a marker device antenna; and
an electronic circuit operatively coupled to the marker device antenna, the electronic circuit including:
a first resonant circuit formed with the marker device antenna for receiving an excitation signal at a first frequency from a marker excitation device;

a power circuit for converting the excitation signal to a power supply for powering the electronic circuit;

a processing element for generating an output signal responsive to the excitation signal; and a second resonant circuit for providing the output signal to the marker device antenna, wherein the output signal is generated at a second frequency substantially different from the first frequency.

2. The marker device of claim 1, wherein the second resonant circuit comprises one or more tuning elements for tuning the output signal to be provided to the marker device antenna; wherein the tuned output signal has an amplitude greater than that of the generated output signal.

3. The marker device of claim 1, further comprising one or more housings for enclosing the marker device antenna and the electronic circuit from ingress of environmental solid and liquid contaminants upon underground burial, the housings shaped to minimize detuning of the marker device in a predetermined environment.

4. The marker device of claim 3, wherein each of the one or more housings include a dielectric layer for reducing capacitive coupling to the ground or other environment in which the marker device is embedded.

5. The marker device of claim 4, wherein the dielectric layer has a thickness of at least twice the diameter of a conductive core of the marker device antenna.

6. The marker device of claim 1, wherein the excitation signal is a continuous RF signal and the power circuit converts the continuous RF signal to a DC power supply.

7. The marker device of claim 1, wherein the marker device housing is in a toroidal shape.

8. The marker device of claim 1, wherein the marker device housing is in a ground stake shape.

9. The marker device of claim 1, wherein the marker device housing is in a pipe sleeve shape.

10. The marker device of claim 1, wherein elements of the electronic circuit are selectively enabled or disabled to reduce power consumption.

11. The marker device of claim 1, wherein the processing element generates a modulated output signal responsive to the received excitation signal, the modulated output signal being one or more of an amplitude shift keying (ASK), a phase shift keying (PSK), and frequency shift keying (FSK) modulated with data.

12. The marker device of claim 11, wherein the data includes at least one of a serial number of the marker device and a data defining a position of the marker device.

13. The marker device of claim 1, wherein the output signal is generated at a plurality of frequencies different from the first frequency.

14. A marker device embedded utility pipe, comprising:
an elongate pipe or tube; and
a plurality of marker devices disposed along the length of the pipe or tube, each marker device comprising:
a marker device antenna; and
an electronic circuit operatively coupled to the marker device antenna, the electronic circuit including:
a first resonant circuit formed with the marker device antenna for receiving an excitation signal at a frequency from a marker excitation device;
a power circuit for converting the excitation signal to a power supply for powering the electronic circuit;
a processing element for generating an output signal responsive to the excitation signal; and
a second resonant circuit for providing the output signal to the marker device antenna, wherein the output signal is generated at one or more frequencies substantially different from the frequency of the excitation signal.

15. The utility pipe of claim 14, wherein the plurality of marker devices are configured to be simultaneously energized in response to receiving the excitation signal.

16. The utility pipe of claim 14, wherein the plurality of marker devices are configured to be sequentially energized in response to receiving the excitation signal.

17. The utility pipe of claim 14, wherein the plurality of marker devices are configured to be selectively energized based on one or more of a frequency, duty cycle, and coding of the excitation signal.

18. The utility pipe of claim 14, wherein the pipe or tube is comprised of a non-conductive material.

19. A marker device embedded utility pipe, comprising:
a utility pipe or tube;
a marker device antenna including a plurality of turns disposed on or within the utility pipe or tube; and
one or more electronic circuits operatively coupled to one or more sections of the marker device antenna, the electronic circuits including:
a first resonant circuit formed with the marker device antenna section for receiving an excitation signal at a first frequency from a marker excitation device;
a power circuit for converting the excitation signal to a power supply for powering the electronic circuit;
a processing element for generating an output signal responsive to the excitation signal; and
a second resonant circuit for providing the output signal to the marker device antenna, wherein the output signal is generated at a second frequency substantially different from the first frequency.

20. The marker device utility pipe of claim 19, wherein the second resonant circuit comprises one or more tuning elements for tuning the output signal to be provided to the marker device antenna; wherein the tuned output signal has an amplitude greater than that of the generated output signal.

* * * * *